(12) United States Patent
    Alonso

(10) Patent No.: US 8,789,499 B2
(45) Date of Patent: Jul. 29, 2014

(54) MONOBLOCK VALVELESS OPPOSING PISTON INTERNAL COMBUSTION ENGINE

(75) Inventor: José Luis Alonso, Avda. de las Instrucciones (UY)

(73) Assignee: Two Heads, LLC, Washington, DC (US)

( * ) Notice: Subject to any disclaimer, the term of this patent is extended or adjusted under 35 U.S.C. 154(b) by 1190 days.

(21) Appl. No.: 12/265,863

(22) Filed: Nov. 6, 2008

(65) Prior Publication Data
    US 2010/0282219 A1    Nov. 11, 2010

Related U.S. Application Data

(60) Provisional application No. 61/002,380, filed on Nov. 8, 2007, provisional application No. 61/082,378, filed on Jul. 21, 2008.

(51) Int. Cl.
    *F01B 7/14*    (2006.01)
    *F01B 7/00*    (2006.01)

(52) U.S. Cl.
    USPC .... 123/51 R; 123/51 A; 123/51 B; 123/50 R; 123/48 R; 123/197.4

(58) Field of Classification Search
    USPC ......... 123/50 A, 50 B, 50 R, 53.3, 53.6, 53.7, 123/55.5, 55.7, 51 R–51 BD
    See application file for complete search history.

(56) References Cited

U.S. PATENT DOCUMENTS

| 2,419,531 | A | * | 4/1947 | Bronander | 123/51 BB |
| 2,840,060 | A | * | 6/1958 | Johansson | 123/41 R |
| 2,882,874 | A | * | 4/1959 | Friedrich | 123/50 R |

(Continued)

FOREIGN PATENT DOCUMENTS

| CN | 2236548 | 10/1996 |
| CN | 1464184 | 12/2003 |

(Continued)

OTHER PUBLICATIONS

Chilean Office Action mailed on Oct. 5, 2011 in Chilean patent application No. 494-10.

(Continued)

*Primary Examiner* — Lindsay Low
*Assistant Examiner* — Kevin Lathers
(74) *Attorney, Agent, or Firm* — Latimer IP Law, LLC

(57) ABSTRACT

The present invention provides an internal combustion engine that provides advantages of both typical 2-stroke engines and typical 4-stroke engines, but using a new design unlike either. The present engine provides for use of pistons as means for opening and closing intake and exhaust ports disposed on cylinder walls. It also provides two pistons per cylinder in an opposing configuration, such that one fuel explosion event causes motion of both pistons per cylinder, in opposite directions. Each piston of a cylinder is connected to a separate crankshaft, which completes a single revolution about its axis per fuel explosion event in a cylinder. In a single cycle of piston movement along the cylinder, a full cycle of ignition, exhaust, intake, and compression is achieved.

20 Claims, 22 Drawing Sheets

(56) References Cited

U.S. PATENT DOCUMENTS

| | | | |
|---|---|---|---|
| 3,084,678 A * | 4/1963 | Lindsay | 123/51 BA |
| 4,520,765 A | 6/1985 | Gerace | |
| 4,996,953 A * | 3/1991 | Buck | 123/51 A |
| 5,058,536 A * | 10/1991 | Johnston | 123/51 BA |
| 5,133,306 A | 7/1992 | Honkanen | |
| 5,375,567 A | 12/1994 | Lowi, Jr. | |
| 5,542,382 A | 8/1996 | Clarke | |
| 5,623,894 A | 4/1997 | Clarke | |
| 5,632,255 A | 5/1997 | Ferrenberg | |
| 6,170,443 B1 | 1/2001 | Hofbauer | |
| 6,250,263 B1 | 6/2001 | Sisco | |
| 2005/0028718 A1* | 2/2005 | Bernier et al. | 114/144 R |
| 2008/0127947 A1 | 6/2008 | Hofbauer et al. | |

FOREIGN PATENT DOCUMENTS

| | | | | |
|---|---|---|---|---|
| CN | 1763356 | | 4/2006 | |
| FR | 2476215 | * | 8/1981 | F02D 15/04 |
| GB | 2 431 695 | | 5/2007 | |
| JP | S56-104120 | | 1/1980 | |
| JP | H2-501941 | | 6/1990 | |
| WO | 88/05862 | | 8/1988 | |

OTHER PUBLICATIONS

PCT/US2008/082563 International Search Report and Written Opinion, dated May 28, 2009.

Office Action, Chinese Patent Application No. 200880121336.6; mailed Jan. 9, 2012 (English language translation).

Regner, G. et al., "The Achates Power Opposed-Piston Two-Stroke Engine: Performance and Emissions Results in a Medium-Duty Application", SAE International, document 2011-01-2221, published Sep. 13, 2011.

Notice of Allowance, Chinese Patent Application No. 200880121336.6; mailed Sep. 27, 2012.

Office Action, Australian Patent Application No. 2008323992; mailed Jun. 7, 2012.

Notice of Allowance, Australian Patent Application No. 2008323992; mailed Jul. 16, 2012.

Office Action; Japanese Patent Application No. 2010-533225; mailed Feb. 5, 2013 (English translation).

Office Action; Mexican Patent Application No. MX/a/2010/004993; mailed Mar. 4, 2013.

* cited by examiner

FIG 2
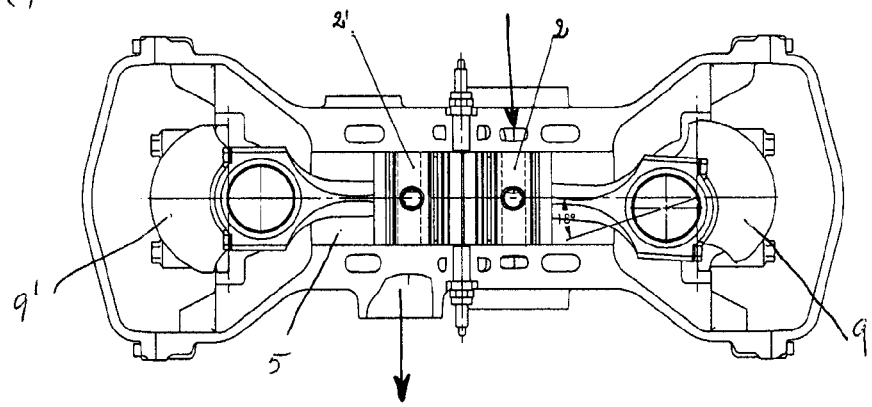
(A)
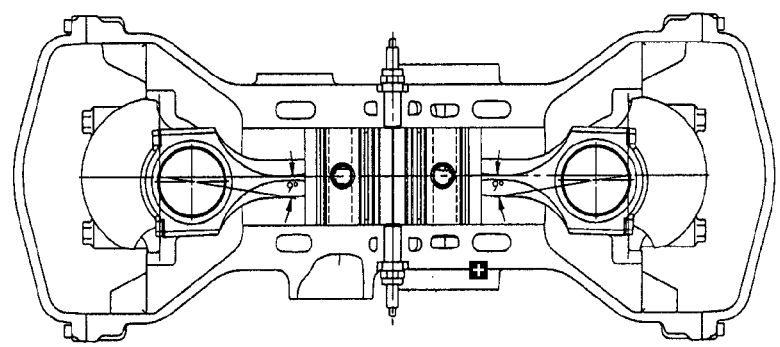
(B)
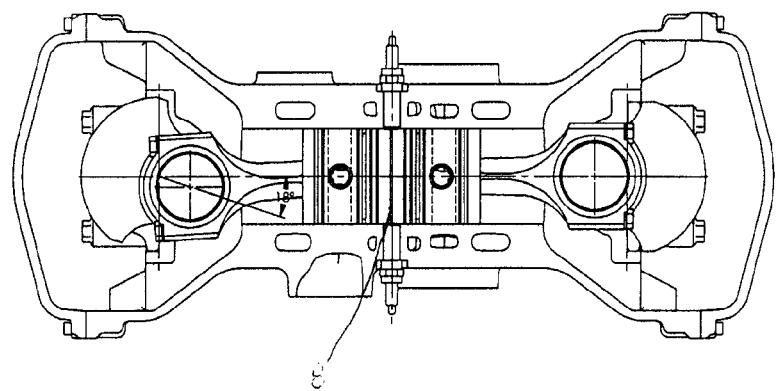
(C)

Fig 2 (cont.)
(D)
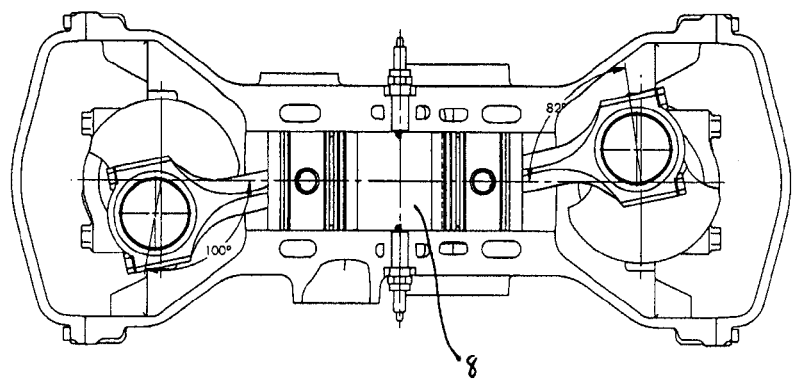
(E)
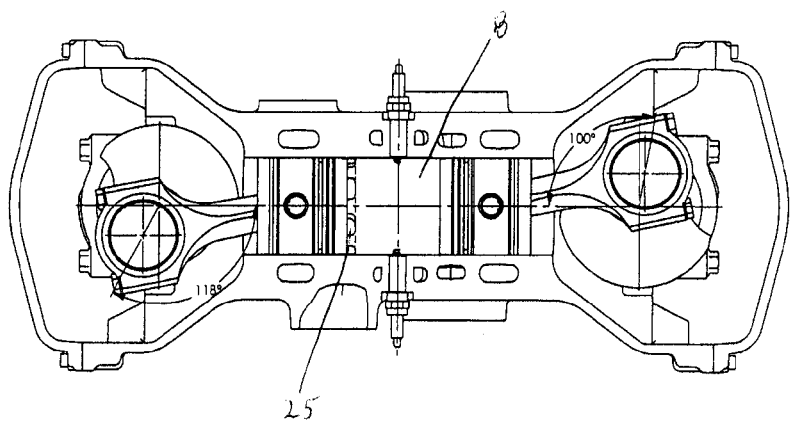
(F)
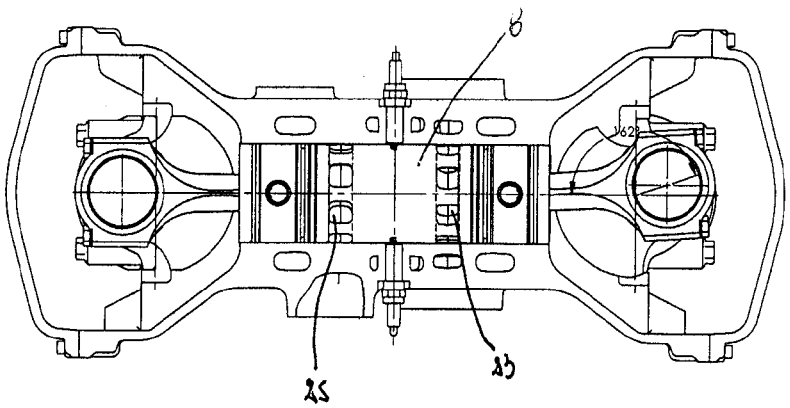

Fig 2 (cont.)
(G)
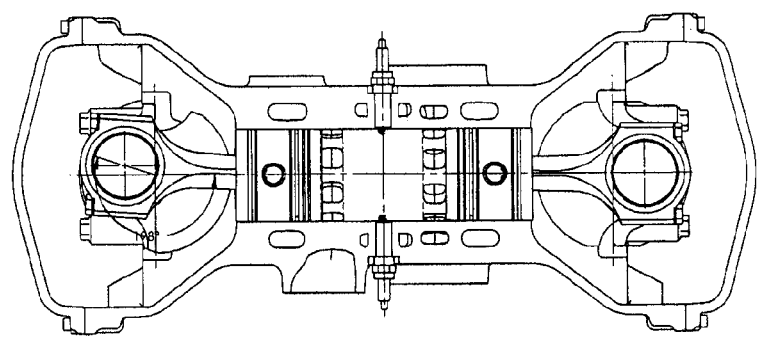
(H)
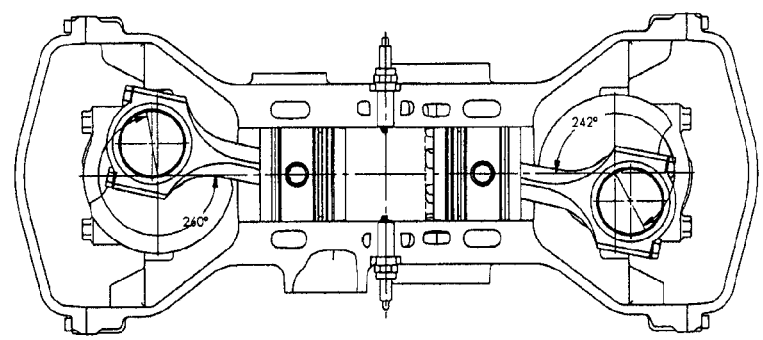
(I)
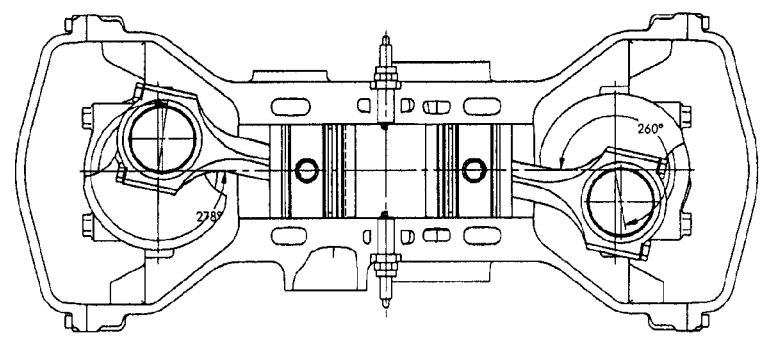

FIG. 3
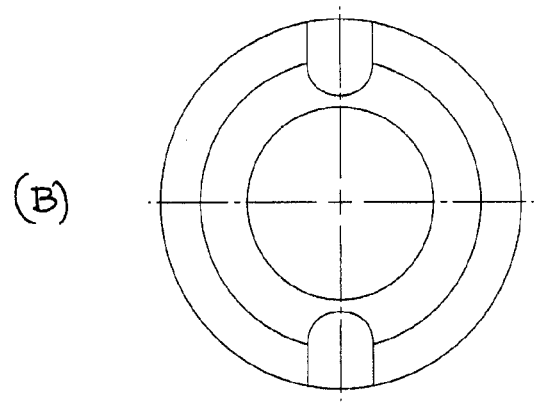
(B)
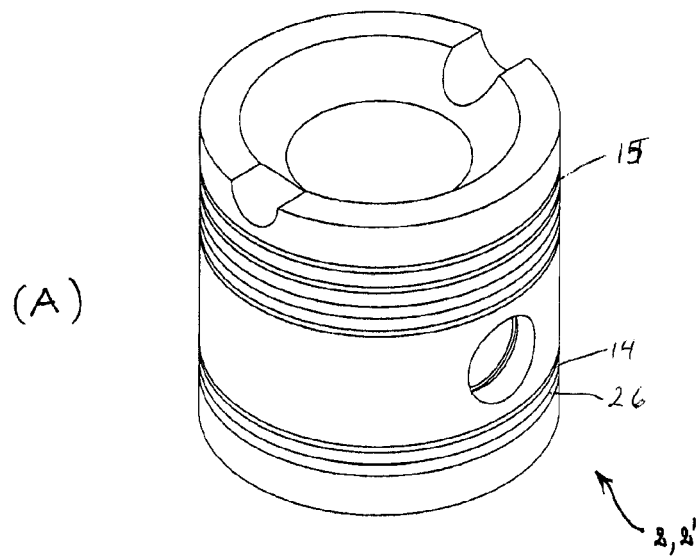
(A)

FIG. 4
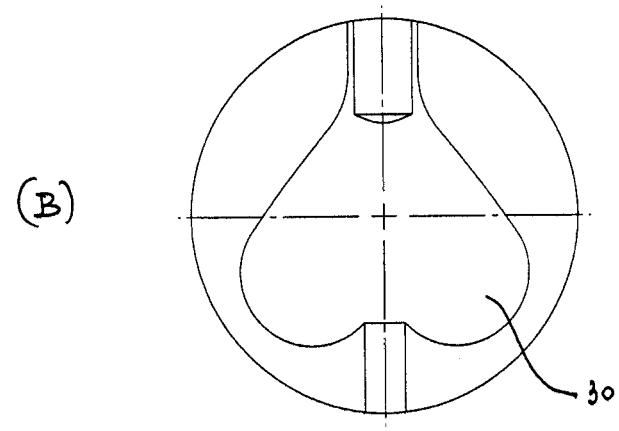
(B)
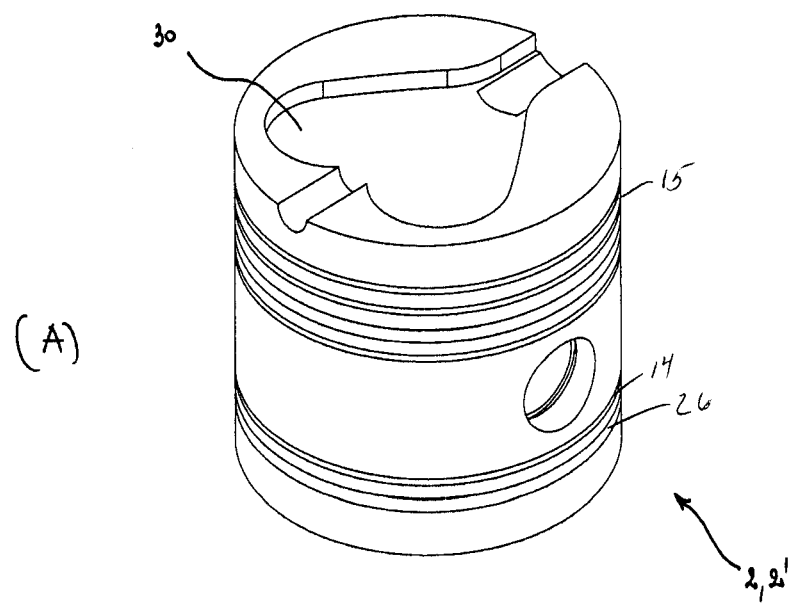
(A)

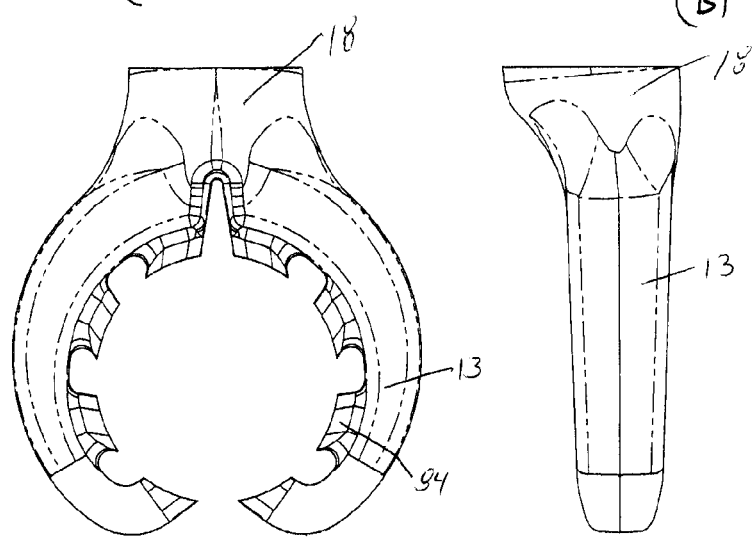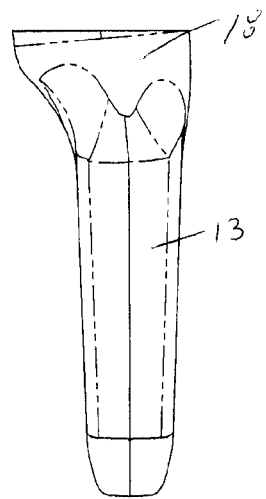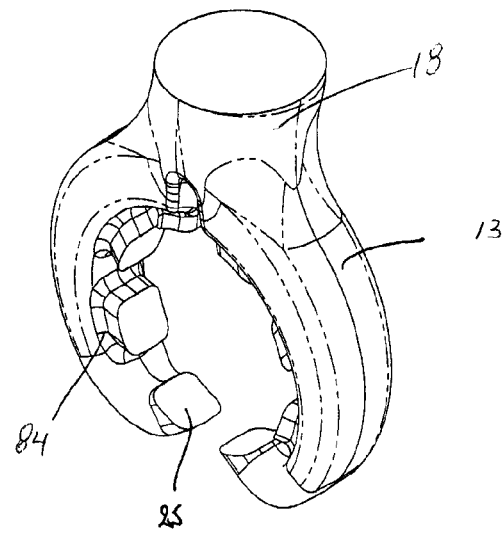
FIG. 9

FIG. 10
(A)
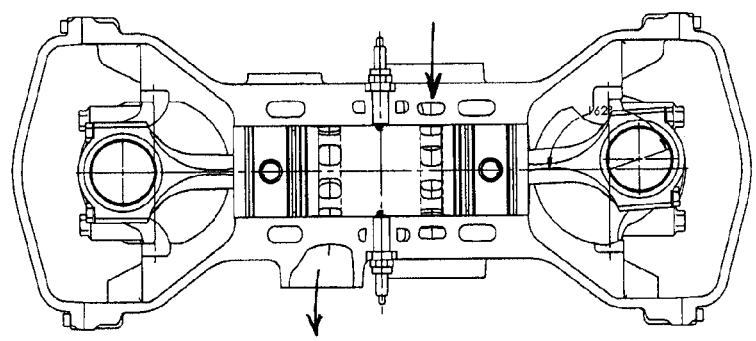
(B)
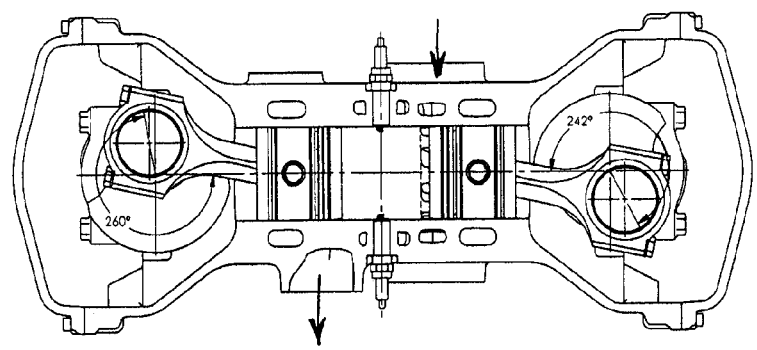
(C)
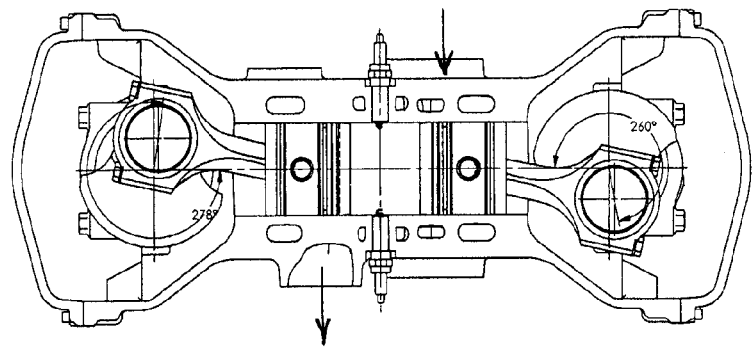

FIG. 10 (cont.)
(D)
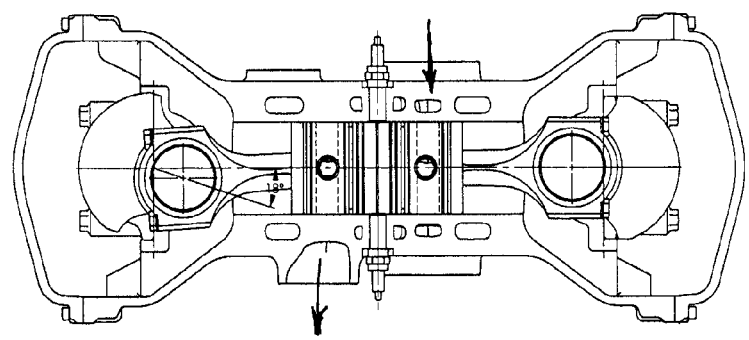
(E)
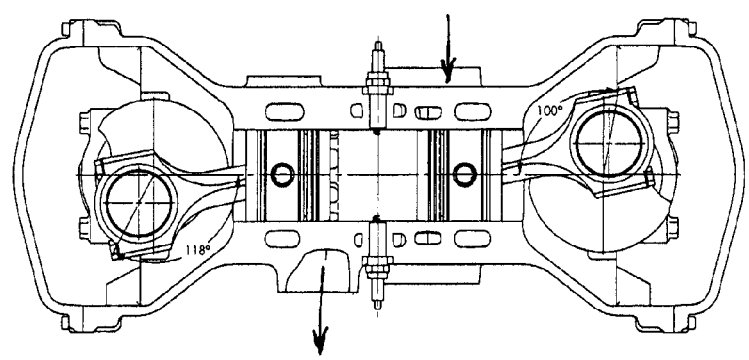

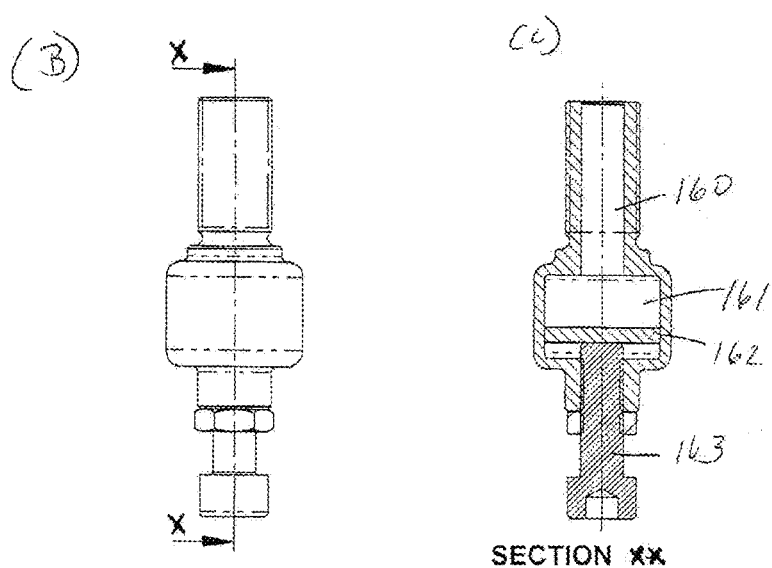
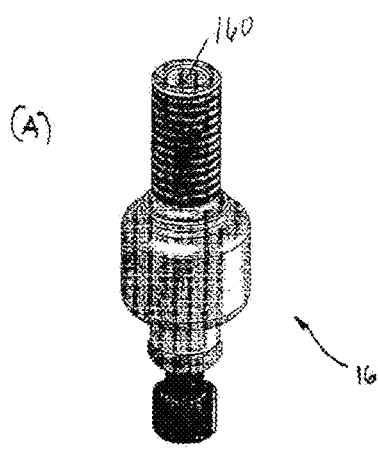
FIG. 16

MONOBLOCK VALVELESS OPPOSING PISTON INTERNAL COMBUSTION ENGINE

CROSS-REFERENCE TO RELATED APPLICATIONS

The present application relies on, and claims the benefit of the filing date of, U.S. provisional patent application No. 61/002,380, filed 8 Nov. 2007, and U.S. provisional patent application No. 61/082,378, filed 21 Jul. 2008, the entire disclosures of both of which are hereby incorporated herein by reference.

BACKGROUND OF THE INVENTION

1. Field of the Invention

The present invention relates to the field of internal combustion engines. More specifically, the present invention relates to a five-cycle internal combustion engine that is suitable for use as both a gasoline engine and a diesel engine, having an improved design that allows for improved fuel efficiency and improved power production.

2. Description of Related Art

Internal combustion engines are known in the art. For example, various engines with piston arrangements or sets that work face-to-face are known in the art, but none of those engines manages to optimize its operation to obtain a complete cycle engine.

For example, the engine described in U.S. Pat. No. 5,133,306 comprises two pistons facing each other. However, the engine also includes an auxiliary combustion chamber or pre-chamber on its top part wherein valves and a sparkplug are housed. Furthermore, the engine body described in that patent is not a monoblock engine body. In addition, the engine has three crankshafts so that the two crankshafts that receive the explosion pulse are not connected to each other but through a third one. The engine disclosed in the patent causes an explosion every two crankshaft revolutions and the valves are actuated exclusively by means of a camshaft.

In U.S. Pat. No. 5,632,255, an engine comprising a cylinder lid and having a vertical arrangement is described. The engine has a single crankshaft, one piston per cylinder, and a porous body regenerator having a diameter slightly less than the sleeve and moved by a stiff rod. The engine works in a two-stage cycle that equals the cold or hot operation.

The motor described in U.S. Pat. No. 4,520,765 comprises the following features: sleeves having ports; pistons moved by balls that transmit a force through an endless rotary; ignition is produced specifically by the temperature achieved by the compression of the air/fuel mixture, and although it manages to make an explosion per cylinder in each engine revolution, the working times are short because the piston stroke is very reduced; variable opening ports that separate the combustion chambers of each piston, as a consequence of which in each cylinder there are two opposed pistons but with divided chambers.

U.S. Pat. No. 5,375,567 relates to a two-stage engine having ports and a tubular design, without a crankshaft, and having pistons moved as a consequence of the movement of rolls on endless-type spirals. The engine uses air cooling.

While there have been many designs for internal combustion engines, there still exists a need in the art for improved engines that provide better fuel efficiency, more power, or both.

SUMMARY OF THE INVENTION

The present invention provides an internal combustion engine that addresses needs in the art. More particularly, the invention relates to an internal combustion engine characterized in that each cylinder/piston combination completes a full cycle per crankshaft rotation. That is, in a single rotation of the crankshaft, a cylinder/piston combination completes the following: sweeping or flushing of exhaust from the cylinder; intake of air/fuel mixture; compression; explosion; and exhaust. The internal combustion engine of the present invention can also be characterized as having a variable compression ratio; having a five stroke thermodynamic cycle (i.e., five well-defined stages); having a monoblock cylinder (i.e., cylinder block and head fabricated as a single unit) having opposed piston pairs that interact to generate rotational energy in at least one crankshaft; having cylinders that allow for overcharge admission and sweeping of exhaust gases; or combinations of two or more of these. In general, the opposed piston pairs of embodiments of the engine arrive at their respective top dead centers (also referred to herein as top dead points or upper dead centers) at about the same time, which allows for a single explosion in the chamber to drive both pistons in opposite directions simultaneously. This produces as many explosions per rotation, at identical intervals, as the number of cylinders that the engine has.

The present invention provides an internal combustion engine that can be, in embodiments, characterized as a horizontally arranged multi-cylinder monoblock-type engine having opposed piston pairs in a monochamber, wherein both pistons share the same combustion chamber. The engine can carry out all of the stages required of an internal combustion engine per crankshaft rotation. That is, the engine is capable of making an explosion per cylinder, at identical intervals, for each crankshaft rotation. In preferred embodiments, the spark plugs are directly in the upper dead-center position of one of the pistons, referred to as the admission piston, with each cylinder comprising one or two spark plugs per cylinder. In embodiments, one or more spark plugs may be removed, and the spark plug port used as a port for connecting a hollow chamber, which allows the compression ratio of the engine to be adjusted or modified as needed, for example, for different fuels.

The engine of the invention does not include admission (intake) and exhaust valves to open and close intake and exhaust ports, respectively, as is typical in engines running at more than two strokes per cycle. Rather, in a manner similar to a two-stroke engine, the present engine comprises cylinder walls having intake (admission) and exhaust ports disposed therein, and uses the movement of the pistons to expose the ports to open them, and cover the ports to close them. As such, the pistons of the present engine provide a dual function: transfer of explosive energy of fuel to mechanical motion of the engine, and valving for movement of fuel and exhaust into and out of the engine cylinders. Further, the design of the present engine eliminates the need for a cylinder lid and connecting materials for it, which are typically required in four-stroke engines.

Having a configuration whereby two pistons move substantially simultaneously in opposite directions, the present engine comprises two crankshafts, each on opposing sides of the engine. The crankshafts are linked by way of gears (typically three gears intermeshed) or by way of one or more connecting bars, which in preferred embodiments is jointed to allow for slight bending, which can provide a benefit as the engine moves from a relatively cold temperature to a relatively high temperature.

As mentioned above, a general feature of the engine of the invention is that a cylinder completes a full cycle of fuel intake and exhaust release per rotation of the crankshaft. The engine thus generally resembles a two-stroke engine; however, there are significant and substantial differences. Briefly, in a two-stroke engine, movement of a piston downward as a result of explosion of fuel creates positive pressure in the crankcase, which drives a fuel/oil mixture in the crankcase into the combustion chamber. Movement of the piston downward also sequentially: opens (by uncovering) the exhaust port; opens (by uncovering) the intake port; closes the intake port; and closes the exhaust port. Thus, one explosion of fuel is correlated with one turn of the crankshaft, and one complete cycle of fuel intake, compression, explosion, and exhaust. The engine is referred to as a two-cycle engine because the functions can be separated into two portions: explosion/exhaust and intake/compression.

Like a two-stroke engine, a cylinder of the present engine completes a full cycle of intake/explosion/exhaust per rotation of a crankshaft. However, unlike a two-cycle engine, the pistons of the present invention do not create a positive pressure in a crankcase that is used to force a fuel/oil mixture into the combustion chamber. Rather, the pistons of the present engine create a sealed chamber encompassing the intake port(s), sealing them from both the combustion chamber and the crankcase. The present invention thus provides a significant improvement in design and efficiency, as power generated from explosion of fuel is not used (lost) in driving fuel into the combustion chamber. Furthermore, the present engine does not use a single piston to open and close both intake and exhaust ports disposed on the cylinder wall. Rather, the present engine comprises a dual piston configuration in which one piston (sometimes referred to herein as the "admission" piston) through its movement back and forth through the cylinder opens and closes, by exposing and covering, respectively, one or more intake (or "admission") ports, whereas the other piston (sometimes referred to herein as the "exhaust" piston) through its movement back and forth through the cylinder opens and closes, by exposing and covering, respectively, one or more exhaust ports. This design provides the ability to precisely control fuel intake and exhaust. Further, it provides the ability to overcharge, or pressurize, the cylinder in preparation for combustion of fuel. In addition, unlike traditional 2-stroke engines, the exhaust port(s) are not closer to the fuel ignition point than the intake port(s). Rather, the two sets of ports are equal distance from the fuel ignition point, and it is a delay between movement of the admission piston with respect to the exhaust piston that allows sequential opening and closing of exhaust and intake ports.

The design of the present engine thus provides many of the advantages of a two-stroke engine, such as: simplicity of design as compared to a four-stroke valved engine (e.g., no requirement for intake and exhaust valves, rocker arms, cam shafts, etc.); reduction in the number of parts (and thus the chances of mechanical failure); completion of a full cycle per rotation of a crankshaft; and dual function of pistons. Likewise, the design of the present invention provides many of the advantages of a four-stroke engine, such as: precise control of intake and exhaust; and avoidance of efficiency losses due to crankcase over-pressurization. Additional advantages derived from one or the other type of engine, or advantages over both types of engines, are discussed or will be apparent from the following discussion.

In exemplary embodiments, the present invention is described in terms of a "five stroke" engine. However, it is to be understood that the engine may be designed and run using fewer or more strokes per cycle. For example, the engine is discussed in detail as allowing for "sweeping" or "flushing" of exhaust from the cylinder chamber using a fluid, such as air. This step or "stroke" can be omitted, resulting in a four-stroke engine. Likewise, additional steps or strokes may be added, if desired, to provide additional features. It is thus to be recognized that the general features of the present engine are sufficient for providing engines of varying designs and configurations, all of which are contemplated by the present invention.

Accordingly, the present invention provides an internal combustion engine comprising at least one cylinder, each cylinder containing two pistons. The two pistons travel along the cylinder in opposite directions, and are disposed in the cylinder such that the two pistons, when at or substantially near top dead center, combine to form a combustion chamber for burning, exploding, igniting, etc. fuel. A single ignition of fuel drives the two pistons in opposite directions along the cylinder until each reaches its maximum distance from the center of the cylinder, at which time each piston begins its return journey to once again form a combustion chamber for exploding fuel.

As mentioned, the two pistons in each cylinder are disposed in an opposing fashion. In exemplary embodiments, the cylinder is straight, and the two pistons are directly and completely opposite from each other. Cylinders having a bent (e.g., having a slight or substantial "V" shape) are likewise envisioned, and can provide certain features and advantages as well. The number of cylinders per engine is not particularly limited. The number of cylinders thus may be 1, 2, 3, 4, 5, 6, 7, 8, 9, 10, 11, 12, or greater. It is again to be noted that, unlike typical internal combustion engines, the present engine has two pistons per cylinder; thus, a 2 cylinder engine will have 4 pistons, a 3 cylinder engine will have 6 pistons, etc.

Each cylinder of the engine comprises one or more holes or ports for intake of fluids, and in particular gases such as air or air/fuel mixtures. The ports are disposed along the face of the cylinder wall and provide an entry for the fluids into the cylinder. While a single intake port (also referred to herein as an "admission" port) is adequate, it is preferred that multiple intake ports are disposed along the cylinder wall. Where multiple ports are provided, they are preferably disposed in a relationship such that fluids introduced into the cylinder disperse and mix throughout the chamber. Preferably, the intake ports are all aligned along the circumference of the cylinder, i.e., are disposed along the cylinder wall at the same distance from the center of the cylinder along its length. In this way, movement of the intake piston back and forth along the cylinder opens and closes all intake ports at the same time.

Each cylinder of the engine also comprises one or more holes or ports for exhaust of fluids in the cylinder. In a similar manner to the intake ports, the exhaust port(s) are disposed along the cylinder wall at the same distance from the center of the cylinder along its length. In preferred embodiments, the exhaust ports are disposed on the cylinder wall at the same distance from the center of the cylinder as the intake ports. It is important to note that the intake and exhaust ports are disposed on opposite sides of the center point of the cylinder, such that the admission piston sequentially covers and uncovers the intake port(s) whereas the exhaust piston sequentially covers and uncovers the exhaust port(s). Furthermore, it is preferred that the intake and exhaust ports are disposed along the cylinder wall at a position whereby the top surface of the piston head aligns with the farthest edge of the intake or exhaust port(s) such that the ports are fully opened at the time when the piston is at its lower dead center. In this way, ports are fully opened by the movement of the pistons, yet extra movement of the pistons beyond the point where they are functioning to open and close ports, which would be essentially wasted motion, is avoided.

Each cylinder of the engine also has one or more openings for spark plugs or other devices that promote, permit, or cause combustion of fuel in the combustion chamber (e.g., a glow plug for diesel engines). The openings may be disposed at any point along the wall of the cylinder that makes up the combustion chamber. Typically, one or two openings are provided. Preferably, where two or more openings are provided, the openings are distributed about the cylinder wall in a way that achieves as near to equidistant spacing as possible. For example, where two openings are provided, they are preferably located along the cylinder wall at positions whereby the opening aligns with the top and bottom of the engine (e.g., 180° apart). Where three openings are provided, a separation of 120° might not be possible due to the overall shape of the engine (e.g., substantially flat). Therefore, one opening may be disposed on one side of the engine and two openings may be disposed on the other side of the engine, in a manner where the angular separation between each opening can vary, but will preferably be as near to 120° as feasible. Where four openings are provided, they may be separated, for example, at equal or nearly equal angular distances, forming an "X" shape when the engine is viewed from the side. Of course, where desired, the angular separation between openings may be varied to suit particular purposes. As discussed below in more detail, one or more of the openings may be used for inclusion of elements other than devices that promote, permit, or cause combustion of fuel. As will be apparent from the above, the engine thus comprises one or more devices for causing, etc. combustion of fuel (e.g., a spark plug).

As mentioned above, the engine can be of a monoblock construction, having both the cylinder head and cylinder block formed in a single process. Thus, in these embodiments the engine does not require connection of block and head, nor any connectors, gaskets, or other elements. Furthermore, because the engine does not include intake and exhaust valves, as seen in typical four-stroke internal combustion engines, the engine does not require cam shafts, rocker arms, and other elements typically seen on internal combustion engines that use valves for intake and exhaust. The simplicity of the configuration of the engine allows for ease of construction, using standard metals (e.g., iron, aluminum) for internal combustion engines and standard molding techniques (e.g., die casting using forms).

The pistons of the engine are dual-function pistons. They serve to transfer the energy of combustion of fuel to mechanical energy that causes a crankshaft to rotate. They also serve to open and close intake and exhaust ports, thus allowing movement of fluids into and out of the cylinder. A key feature of the pistons of the present invention is the ability to seal the intake and exhaust ports when in a closed position. This is achieved by including in the piston skirt a second set of rings, which are disposed on the skirt by way of ring grooves in the skirt. In general, a piston according to the present invention comprises two sets of rings, which are disposed on the piston at a distance from each other that is sufficient to completely and fully enclose intake or exhaust ports when the piston is disposed within a cylinder. Thus, for example, where an intake port is 0.5 cm in length, the two sets of rings on the piston can be 0.6 cm apart. Furthermore, the two sets of rings are disposed on the piston at positions that are relative to the distance of travel of the pistons through the cylinder. More specifically, regardless of the specific sizes of the ports in various embodiments, to create a proper closure and sealing of a port, the distance from the UDC for a piston to the farthest edge (relative to the UDC) of the port that the piston serves must be less than the distance from the UDC to the compression ring on the skirt of the piston. Likewise, the distance from the UDC for a piston to the nearest edge of the port must be greater than the distance from the UDC to the compression ring on the head of the piston. While not particularly limited in the total number of rings present, each set of rings on the piston will comprise at least one compression ring set in a groove on the piston skirt surface. In this way, a tight seal can be made between the piston and the cylinder wall, effectively sealing the cylinder chamber from influx or escape of fluid while the piston is covering the port.

Stated another way, the sealing difficulty of the piston rings in this kind of port system is solved by the use of a piston having rings in the head and skirt. Early wear out of the piston rings can be avoided through use of one or more rings. Furthermore, use of multiple ports for intake and exhaust, for example 4 or more of each, increases the number of separated contact points on the cylinder wall for the piston rings (as compared to use of fewer, larger ports), which achieves a better distribution of the supporting points and the contact surface of the rings with the sleeve or cylinder wall. Use of a multi-port design in conjunction with the rings also enables by means of an angular arrangement to direct the inlet and outlet gas flows, thus generating a turbulence that optimizes the combustion chamber performance. In general, the angular arrangement can be conceptualized as a spiral arrangement which causes fluids (e.g., air, air/fuel) to enter the combustion chamber in a swirl pattern or in a manner in which a great amount of turbulence is created, which improves the mixing capacity of the air, and in particular the oxygen in the air, with the fuel. This improved mixing increases the efficiency of the burning of the fuel by, among other things, generating a faster explosion front. One result of this is the ability to reduce the timing advance to a degree much lower than is currently used in commercial engines. For example, due to the high degree of mixing of fuel and oxygen and the overpressurization of the combustion chamber, the time between spark and ignition of fuel is reduced, allowing the timing advance to be reduced to as low as 10° or lower.

Each of the two pistons per cylinder are connected by way of connecting rods to a crankshaft. Connection of one piston to its crankshaft is offset with respect to the other piston and its connection to its crankshaft. Offset can be of any suitable amount, and will generally be between about 10° and about 26°. For example, the offset or delay may be between about 10° and about 25°, between about 12° and about 26°, between about 15° and about 15°, or between about 18° and about 20°. In embodiments, the offset or delay is about 18°. Of course, each specific value encompassed by these ranges can be used, and one of skill in the art will immediately recognize that these ranges disclose each and every specific value falling within the ranges specified, without the need to specifically list each value independently herein. By offsetting the angle of one crankshaft as compared to the other, the two pistons in a cylinder can move in substantial harmony (i.e., both moving away from the center then both moving toward the center) and thus use a single explosion of fuel to drive both pistons outward or away from the center. However, the offset results in movement of one piston to slightly trail movement of the other piston. As such, the leading piston, which is typically the exhaust piston, reaches and opens its ports, and then reaches and closes its ports, just prior to the trailing piston opening and closing its ports. As such, a finely controlled, sequential opening and closing of ports can be accomplished. Where the leading piston is the exhaust piston, a sequence as follows is achieved: combustion, opening of exhaust port, opening of intake port, closing of exhaust port, closing of intake port; and compression. As such, a single rotation of a crankshaft is linked to a single fuel ignition event and a complete cycle fuel intake and exhaust. It is to be understood that the placement of ports along the cylinder wall will be determined in conjunction with the following parameters: total distance travelled by the piston that serves the port along the cylinder (i.e., from its UDC to its LDC), and angle of offset or delay of one piston/crankshaft from the other. With regard to angle of offset, in general, a shorter offset or delay between the exhaust piston and the admission piston requires the leading edge of the ports to be placed closer to the admission piston UDC to allow for sufficient opening and closing of ports such that exhaust gas can be thoroughly swept from the combustion chamber, and the combustion chamber overcharged before compression and ignition of fuel. Furthermore, although an angle outside of about 12° to about 26° can be used for delay of crankshaft turning and piston movement within a cylinder, it is preferred to use angles within these ranges to maximize engine performance. For example, as one raises the angle, the leading piston gets farther and farther away from UDC when a fuel ignition event occurs. At a point beyond about 26° offset, the distance becomes so great that there is a loss in power output of the cylinder, as the leading piston is too far from the point of ignition to absorb an optimal amount of energy.

As is evident, the present engine comprises two crankshafts. As with other elements of the engine, the crankshafts can be manufactured using standard processes and materials. Likewise, each crankshaft is housed in typical fashion in a crankcase comprising a lubricant (e.g., motor oil), etc. It is to be noted that the two crankshafts should include means for combining their respective rotational energies into a single output, which can be used to provide motion to the vehicle in which the engine is disposed.

In embodiments, the means for connecting the crankshafts are gears. For example, gears directly connected to each crankshaft can be physically connected by way of a third, intermediate gear. In other embodiments, the means for connecting the crankshafts is a connecting pin that couples on one end to one of the crankshafts, and on the other end to the other crankshaft, thus linking the two crankshafts. In embodiments, the connecting pin is capable of bending slightly to accommodate the different geometries needed under different engine operating temperatures. More specifically, according to this embodiment of the engine, a connecting pin that comprises a hinge or hinge-like mechanism at a point along its length is provided. The mechanism allows the pin to continue to make a consistent connection between the two crankshafts as the engine changes in temperature. That is, as an engine heats up, the metal parts expand. The distance between two crankshafts and the intrinsic size of the connecting pin thus change as the temperature of the engine changes. To account for this change, the connection points between the pin and crankshafts must either include some play (i.e., not be a tight connection), or a mechanism must be provided to allow for expansion and contraction of the relevant parts while maintaining a tight connection. The present invention provides such a mechanism in the connecting pin. The hinge-like mechanism allows the connecting pin to slightly bend at a controlled point when needed, but then straighten back out when a bend is not required. In this way, a tight connection at the pin/crankshaft junction can be made without sacrificing engine performance and without causing excessive wear at the junction.

As mentioned above, in embodiments, the engine of the invention comprises two or more openings that can accommodate spark plugs or the like. In certain embodiments, one or more of the openings are used as connections for devices that alter the size of the combustion chamber. More specifically, in a gasoline engine, instead of providing two spark plugs, one of the spark plugs may be replaced by a device that is, in essence, a dead-space chamber. The dead-space chamber effectively acts to increase the size of the combustion chamber, while at the same time not directly participating in the process of combustion of fuel (i.e., no or essentially no combustion of fuel occurs in the dead-space chamber). An increase in the size of the chamber changes the compression ratio of the cylinder, and can be advantageous when different fuels are used or when different performances from the engine are desired. In preferred embodiments, the dead-space chamber is adjustable such that the total volume of the chamber can be finely tuned for different purposes. Tuning can be performed manually or electronically by means known in the art (e.g., turning a set screw to move a platform within the chamber to increase or decrease the gas volume in the chamber).

The engine of the invention typically comprises multiple intake and exhaust ports per cylinder. The ports of each type can be connected to each other and to a single conduit for movement of fluids. For example, the intake ports can be connected by way of a generally circular or generally spiral conduit, which links the intake ports to each other and to a source for introduction of fuel, air, or a mixture into the cylinder. These conduits may be combined into a larger conduit that links the smaller conduits to a source of fluid, for example air. In embodiments, the larger conduit is a generally "U" shaped tube that fluidly connects a supercharger to each of the smaller conduits, and thus to the intake ports. When the supercharger is running, the U-shaped tube acts as a plenum to provide pressurized air or air/fuel mixtures to the combustion chambers through the intake ports.

Likewise, the exit ports can be connected to each other and to a single conduit for movement of fluids. For example, the exhaust ports can be connected by way of a generally circular or generally spiral conduit, which links the exhaust ports to each other and to a means for expelling exhaust gas from the engine (e.g., an exhaust system). The shape and number of intake and exhaust ports are preferably designed in conjunction with the shape of the respective conduits to improve fluid movement into and out of the cylinder. For example, intake ports and conduits may be designed to provide superior mixing of air and/or fuel within the combustion chamber. Likewise, exhaust ports and conduits may be designed to provide rapid and substantial removal of fluids (e.g., exhaust) from the combustion chamber and to dissipate heat.

BRIEF DESCRIPTION OF THE DRAWINGS

The accompanying drawings, which are incorporated in and constitute a part of this specification, illustrate several embodiments of the invention, and together with the written description, serve to explain certain principles of the invention.

FIG. 2, Panels A-I, show cross-sectional views of a cylinder according to embodiments of the invention, sequentially showing the positions of pistons during a full cycle.

FIG. 3, Panel (A) shows a perspective view of a piston in a gasoline or alternative fuels version of an engine of the invention. Panel (B) shows a plan side view thereof.

FIG. 4, Panel (A) shows a perspective view of a piston in a diesel or alternative fuels engine. Panel (B) shows an upper plan view thereof.

FIG. 9 shows an embodiment of an exhaust conduit. Panel (A) shows a view in side plan; Panel (B) shows a view in frontal plan; and Panel (C) shows a view in perspective plan.

FIG. 10, Panels (A)-(E), show operation of an embodiment of the engine when running as a five-stroke engine, showing the positions of the pistons at each cycle.

FIG. 16, Panel (A), shows the auxiliary compression chamber of FIG. 15 in a perspective view. Panel (B) shows the chamber in a face view. Panel (C) shows a cross-section of the chamber along line XX as it is shown in the face plan view of it.

DETAILED DESCRIPTION OF VARIOUS EMBODIMENTS OF THE INVENTION

Figure 1:
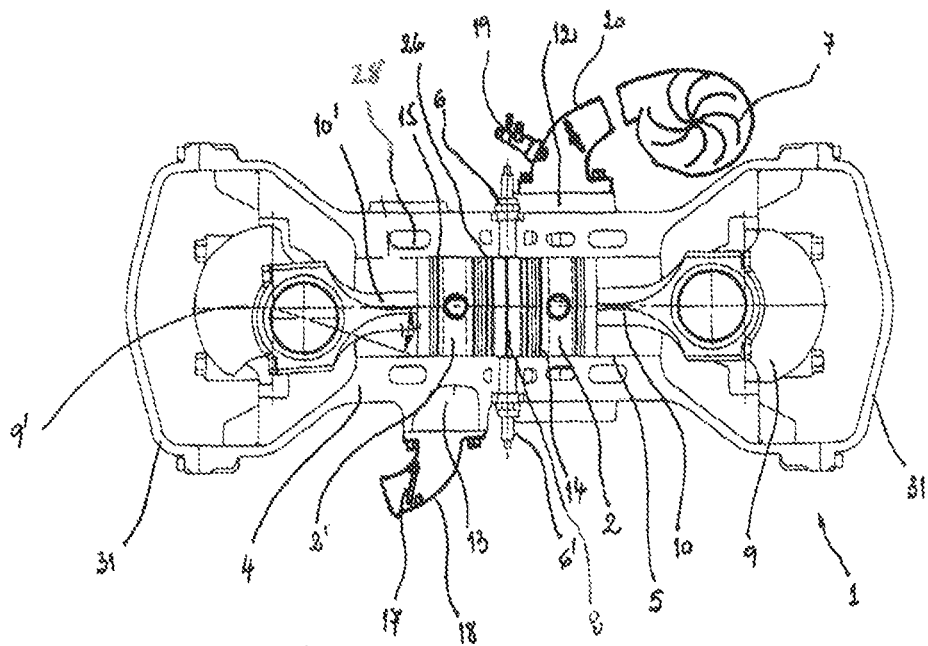
FIG. 1 shows a cross-section view of a cylinder according to embodiments of the invention. Panel A depicts a cylinder with constituent parts that include an intake conduit comprising a fuel injector. Panel B depicts a cylinder with constituent parts that include a fuel injector disposed in a spark plug opening.
Figure 1:
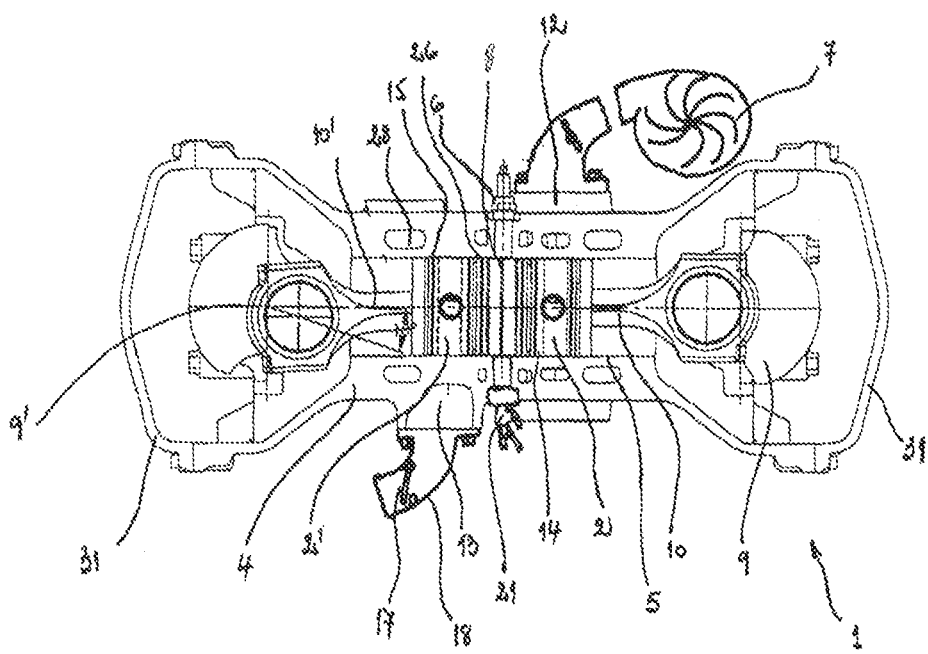

Reference will now be made in detail to various exemplary embodiments and features of the invention, examples of which are illustrated in the accompanying drawings. The following detailed description is provided to give the reader a more thorough understanding of certain features of the invention, and should not be considered as a limitation on any aspect of the invention.

The internal combustion engine of the present invention has numerous features and combinations of features that provide improvements in fuel efficiency, power generation, adaptability, and other beneficial improvements, as compared to commercially available engines. One notable feature includes dual-action pistons, which act as both pistons for transfer of explosive energy from the combustion of fuel to mechanical energy, and as valves for opening and closing of intake and exhaust ports for fuel and exhaust, respectively. Unlike known two-stroke engines, which use pistons to open and close ports, but which do not seal the intake port but rather merely redirect the inflow of fluid to the crankcase instead of to the combustion chamber, the pistons of the present invention create an independent chamber for containing intake fluids. Another notable feature is a design that includes at least one single cylinder that comprises two diametrically opposing pistons, each connected to a separate crankshaft, wherein the connection of one of the two opposing pistons to its crankshaft is offset, with respect to the other piston's connection to its crankshaft. Yet another notable feature of the present invention is an engine design that allows for one complete cycle to occur for each rotation of a crankshaft (per cylinder), and being able to produce as many explosions per crankshaft rotation as cylinders that it has. Yet again, the invention provides for the use of a supercharger to overcharge or overpressurize a combustion chamber created by a cylinder wall and two opposing pistons, to sweep remaining exhaust gas from the combustion chamber, or both. A further non-limiting example of a feature provided by the present invention is a variable compression chamber, which can be adjusted as desired to provide different compression ratios for combustion of fuels. Other non-limiting examples of features of the invention include: inlet ports and conduits that are disposed such that fuel entry into the combustion chamber is advantageous for thorough mixing and superior combustion of the fuel; exit ports and conduits that are disposed to efficiently remove exhaust gas and transmit heat from the combustion chamber to the cooling system; and a means for connecting and stabilizing two crankshafts of a twin crankshaft engine without the use of gears, sprockets, and the like.

In general, the engine of the present invention links, in a one-to-one ratio, a single rotation of a crankshaft to a single complete cycle of combustion/exhaust. Like a standard two cycle engine, in the present engine, the spark-plug fires once every rotation of the crankshaft. This provides for improved power production, as compared to a four cycle engine, in which one rotation of the crankshaft is used for intake and compression of fuel, and a second rotation of the crankshaft is used for exhaust of spent fuel. However, unlike a two cycle engine, the engine of the present invention does not use the power of the moving piston to take in fuel for a subsequent power stroke. According to the present engine, active work is carried out during 50% of the piston stroke, from the upper dead center (UDC) to the inferior dead point (PMI), in each crankshaft rotation, in this way doubling the useful work carried out as compared to conventional engines.

In comparison, in a current four-stroke engine, during intake (stroke 1 of 4), there is energy expended. Likewise, during the compression stroke (stroke 2 of 4) and during the exhaust stroke (stroke 3 of 4), energy is expended. Active work is thus only generated during the explosion and expansion stroke (stroke 4 of 4). This energy-producing fraction is only 25% of the time a piston is in motion.

In the same way, in a current two-stroke engine, active work is performed only until the exhaust port is uncovered completely. Beyond that point, energy is expended by the motion of the piston to generate pressure in the crankcase that is used to cause subsequent reloading of fuel into the compression/combustion chamber through the intake port.

The engine according to the present invention comprises two crankshafts arranged one on each side of the block and mechanically linked, preferably by means of one or more connecting pins. In preferred embodiments, admission and expulsion of gases into and out of the cylinder(s) is assisted by a volumetric compressor, such as a supercharger, wherein the valving function for intake and exhaust is performed by one or more pistons acting a dual function piston-valves. In addition, the supercharger may provide an added function: to cool the piston rings by reducing the pressure difference on the rings between the combustion chamber side of the rings and the crankcase side of the rings.

In preferred embodiments, the crankshafts are connected to the pistons in a manner such that there is a phase displacement or offset of the relative position between them, causing the pistons in each cylinder on one side of the engine to move along the cylinder slightly ahead of the mating pistons on the other side of the engine. In this way, the pistons, and in particular piston pairs, can act as valves to sequentially open and close intake and exhaust ports, and further allow for overloading or overcharging of pressure and/or fuel in the cylinders.

As mentioned above, the pistons of the present invention act with a double function: as both piston and valve because they control by themselves the opening and closing of admission and exhaust ports. The pistons have extra compression rings to achieve this double function—one compression ring in the head and another one in the skirt. In embodiments, the piston also comprises a blind bolt.

In general, and in preferred embodiments, the engine according to the present invention comprises admission and exhaust ports located in each cylinder equidistant to the UDC of the admission piston.

The engine is particularly well suited for use in a fuel injection scheme. In embodiments where the fuel injection is indirect, a conventional injector can be preferably located in the admission duct or conduit, next to the air inlet to the cylinder. Alternatively, where fuel injection is a direct injection, a conventional injector can be preferably disposed through the cylinder wall, for example at a point along the cylinder wall that defines the combustion chamber. In such an embodiment, the injector can replace a spark plug or the like.

In embodiments where the engine is to be used for burning two or more different fuels, the engine can comprise, as substitution for a spark plug, an auxiliary chamber, the internal volume of which can be varied as desired to achieve a proper compression for the specific needs of the injected fuel.

To perform the synchronized linking between the crankshafts maintaining the angular phase displacement between them, it is preferable to utilized a train of three gears united among them, or a pair of connecting pins phase-displaced among them approximately to 90° sexagesimal in order to keep the invariable rotation direction.

The spark plugs of embodiments of the present engine in a gasoline version are located directly in the UDC position of the admission pistons. While the plugs may be located at any position within the combustion chamber, it is preferred to locate them in the UDC position for the admission pistons.

In embodiments in which indirect injection is used, the Electronic Command Unit (ECU) is calibrated to accommodate the two distinct steps of flushing/sweeping of the combustion chamber and introduction of fuel into the combustion chamber. That is, the supercharger will supply a positive pressure of air to the intake ports while the engine is running. However, fuel should not be introduced into the combustion chamber during the sweeping step—rather, only air should be introduced. Thus, the ECU must be calibrated to cause fuel injection into the combustion chamber only in the air that will remain in the chamber once the exhaust ports are closed.

Turning now to the figures, examples of engines, their constituent parts, and their modes of action are described. According to the exemplary engines, non-limiting optional features include: efficiency with its consequent fuel economy, with the possibility of varying its compression relation enabling the use of different fuels; simplicity; optimization of constituent parts and work done; longer useful life; less weight at an equivalent power; less vibration; lower vibration; lower center of gravity; fewer parts that are individually subject to smaller effort.

FIG. 1 depicts a cross-section of a cylinder according to an embodiment of the present internal combustion engine (1). The figure shows a single cylinder (3) containing two pistons (2,2') opposite each other with heads facing each other, the cylinder disposed in a cylinder block and head of monoblock construction (4), which thus lacks cylinder lids, a head/block joint, and intake and exhaust valves. In operation, combustion of fuel and creation of mechanical energy is performed in a five-stroke cycle per rotation of a crankshaft. In the cycle, during movement of two opposing pistons from their upper dead-center positions (UDC) to their lower dead center positions (LDC), the cylinder carries out a total expansion and begins the process of exhaust. During movement from the pistons' LDC to their UDC, the cylinder completes the exhaust stroke, performs a total chamber assisted sweep of the combustion chamber, and completes refilling and overloading of the admission/compression chamber, and finally completes the compression stroke. The cycles can also be defined by reference to the status of ports in the cylinder during travel of pistons from UDC to LDC: first there is an ignition/explosion and expansion phase with both intake and exhaust ports closed; next, there is an exhaust phase with the exhaust port(s) open and the intake port(s) closed; next, there is a sweeping phase with both exhaust and intake ports open; next, there is a fuel intake and an overcharging phase with the exhaust port(s) closed and the intake port(s) open; and finally, there is a compression phase with both intake and exhaust ports closed.

The engine (1) depicted in FIG. 1(A) includes: spark plugs (6,6') located directly in the UDC position of the admission piston (2); a volumetric compressor (7) or supercharger to create a positive pressure to force fluids, such as air and fuel, into the cylinder (5), to be used for forcing exhaust gas from the cylinder (5), for sweeping of the cylinder (5), and for introduction and overcharging of fuel/air in the compression/combustion chamber (8); two crankshafts (9,9') linked to piston connecting rods (10,10') and synchronized between each other by appropriate mechanical means (not depicted), wherein the crankshaft arrangement makes it possible to carry out one explosion in cylinder (5) per crankshaft rotation. The crankshaft is positively caused to rotate during 50% of the piston stroke time represented by the explosion and expansion stages during which the piston is moving toward the crankshaft. To allow driving of two pistons per cylinder with a single explosion, to allow for sequential opening and closing of intake and exhaust ports, and to allow for overloading of the cylinders, the crankshafts are mounted spaced apart from each other between about 15° sexagesimal and approximately 25° sexagesimal, for example 18°. Preferably, the crankshafts (9,9') are mounted spaced apart from each other from approximately 17° sexagesimal and approximately 21° sexagesimal in such a way to allow an overload in the cylinder (5). More preferably, the crankshafts (9,9') are mounted spaced apart between approximately at 18° sexagesimal and approximately at 20° sexagesimal to allow an overload in the cylinder (5).

At a determined area of the piston strokes, the pistons (2,2') are controllers of the opening and closing of the admission ports (23) and exhaust ports (25) (not shown), which are in open communication with admission chamber (12) and exhaust chamber (13). Tight sealing of ports (23,25) is achieved by extra compression rings (14,15) on each piston (2,2') in addition to oil rings (26), at least one of the compression rings being at the piston head and at least another of which is on the skirt. The admission (23) and exhaust (25) ports are located in the cylinder (5) and equidistant to the respective upper dead centers of their pistons (2,2').

Preferably, the engine (1) includes an exhaust gas anti-reflux flap (17) as a closure mounted in the exhaust duct (18) next to the exhaust port (13).

As shown in FIG. 1(A), where the engine (1) comprises an indirect fuel injection system, a conventional injector (19) is located in the intake duct (20) next to the intake port (12). As shown in FIG. 1(B), where the engine (1) comprises a direct fuel injection system, a conventional injector (21) is located in the cylinder (5) as a substitute for a spark plug (6' in FIG. 1(A)).

A feature of embodiments of the present engine is that it is of horizontal construction. That is, the cylinders are arranged such that, when the engine is placed in a stationary vehicle, such as a car on the ground, the cylinders lie horizontally. Due to its horizontal construction, the gravity center of the vehicle onto which the engine is mounted is in a position comparatively closer to the ground than with a usual vertically arranged engine. Likewise, its horizontal arrangement and monoblock construction leads to an arrangement of two dry oil pans (31,31') located on the sides with their respective lower pan or oil pan (32) as the unique oil deposit with drainage plugs (33) (see also FIG. 18). Of course, in other embodiments, placement of the engine within the vehicle can be at any angle relative to the plane of the earth or the horizontal plane of the vehicle.

It is to be understood that, as a general matter, the present engine can include features and elements known in the art, which are not specifically mentioned or discussed in detail herein. Those of skill in the are well aware of such features and elements, and may include them within the design of the present invention without undue or excessive experimentation. One such feature, which is, in fact mentioned now and depicted in FIGS. 1(A) and 1(B) as element (28) are conduits, recesses, etc. for movement of a cooling fluid (e.g., an aqueous coolant or air) through the engine.

FIG. 2, Panels (A)-(I), show in sequence the movement of pistons (2,2') along cylinder (5) as the cylinder moves through a complete cycle (i.e., one fuel ignition event in the cylinder and one rotation of the crankshaft). The elements presented in FIG. 2 are the same as those in FIG. 1; therefore, for the purpose of clarity, only certain elements are labeled or indicated with particularity in FIG. 2. For example, the flow of fluid through the cylinder is indicated using arrows, showing movement of fluid in through an intake port and out through an exhaust port.

FIG. 2(A) depicts an exemplary engine at a time where exhaust piston (2') is at UDC. It can be seen that crankshaft (9') is parallel to cylinder (5) along its length. It can also be seen that intake or admission piston (2) lags behind, and is not yet at its UDC. Instead of being parallel to cylinder (5) along its length, crankshaft (9) is at 18° from parallel to the cylinder along its length.

FIG. 2(B) depicts the same cylinder (5) at a moment after that shown in FIG. 2(A). As shown, piston (2') has now passed its UDC and is travelling toward crankshaft (9'). Piston (2) continues toward its UDC. Crankshaft (9') is now beyond parallel with cylinder (5) by 9°, while crankshaft (9) is now before parallel with cylinder (5) by 9°.

FIG. 2(C) depicts the next moment in time, wherein piston (2) has reached its UDC. It can be seen that, at this point, crankshaft (9) is in a parallel position with regard to cylinder (5), whereas crankshaft (9') is at 18° beyond parallel with cylinder (5). It is at this point when ignition of fuel in combustion chamber (8) occurs, driving pistons (2,2') in opposite directions toward crankshafts (9,9'), respectively.

As shown in FIG. 2(D), in the next moment, pistons (2,2') continue their outward movement, piston (2) lagging behind piston (2'). Force from ignition of fuel continues to drive pistons (2,2') outward, driving rotation of crankshafts (9,9').

At the next moment, as shown in FIG. 2(E), exhaust piston (2') reaches a point at which it begins to uncover exhaust ports (25). It is noted that piston (2) has not yet travelled along cylinder (5) far enough to open intake ports (23). At this point in time, exhaust gas from the explosion depicted at FIG. 2(C) can begin to exit combustion chamber (8).

FIG. 2(F) next shows the following moment in time, in which piston (2') has reached its LDC and piston (2) is approaching its LDC. As can be seen, exhaust ports (25) are now fully open and intake ports (23) are almost fully open. At this time, air is injected into chamber (8) to flush out or sweep out remaining exhaust gas from the previous combustion of fuel in chamber (8). A means for supplying forced air, such as a supercharger connected to the intake ports (23) by way of a plenum, can be used for this flushing or sweeping step. It is to be noted that sweeping of chamber (8) need not be performed throughout the entire time that both ports (25,23) are open. Rather, any suitable amount of time can be used.

FIG. 2(G) shows the next step in the cycle according to this embodiment of the invention. In this figure, it can be seen that piston (2') has begun its return journey toward the center of cylinder (5), while piston (2) is now at its LDC. Piston (2') begins to close exhaust ports (25), while piston (2) allows intake ports (23) to remain wide open. Flushing of chamber (8) may continue during this moment in time.

FIG. 2(H) depicts the engine at the next moment in time, at which piston (2') has travelled far enough toward the center of cylinder (5) that it has fully closed exhaust ports (25). Piston (2) has begun its return journey, and is in the process of closing intake ports (23). At this point in time, fuel (e.g., a fuel/air mixture) is introduced into chamber (8) through intake ports (23). In an alternative embodiment (not shown), air is introduced through intake ports (23) while fuel or a fuel/air mixture is injected directly into chamber (8) by way of a direct fuel injector. In preferred embodiments, a supercharger is used to introduce air or a fuel/air mixture into chamber (8), resulting in overcharging or overpressurization of chamber (8). This overcharging permits improved combustion of fuel in subsequent ignition of the fuel.

FIG. 2(I) depicts the next moment in time, in which piston (2) has travelled toward the center of cylinder (5) to an extent whereby intake ports (23) are closed. The air and fuel mixture in chamber (8) is now compressed by the opposing movement of pistons (2,2'), allowing for efficient ignition of the fuel.

It is to be understood that the process described above continues in the same manner continuously during the time the engine is in operation. Further, although the above description focused on a single cylinder, it is to be understood that multiple cylinders may be provided per engine, each function in the same manner, and each staggered or alternating in the timing of ignition events, thus providing continuous power output for the entire engine.

As should be evident from FIGS. 1 and 2, aiming to remove the valves as constituent parts of the engine (1), and in order to perform an overload of the cylinder (5), a delay must be made in some sexagesimal degrees of crankshaft (9') with regard to crankshaft (9). Setting the angle of crankshaft (9') ahead of the angle of crankshaft (9) by a pre-set number of degrees provides a system in which the movement in each cylinder (5) of the exhaust piston (2') first makes the exhaust piston (2') reach its upper dead center position when the admission piston (2) is still making its upward stroke towards its upper dead center position due to the crankshaft (9) delay degrees. When the exhaust piston (2') begins its downward stroke, the admission piston (2) accompanies it up to its UDC and, when it reaches the UDC, a maximum compression is reached, at which point fuel is ignited, thus driving at the same moment both pistons (2,2') in their respective downward strokes. In view of the fact that the exhaust piston (2') had already begun its downward stroke before the explosion, it will reach the exhaust port(s) (25) before the admission piston (2) reaches the intake port(s) (23), thus causing gas expulsion from chamber (8).

The farthest point travelled by piston (9') is set such that the surface of the head of piston (9') is aligned or substantially aligned with the far edge of exhaust port(s) (25). Having reached the far end of exhaust port (25) coinciding with the downward stroke end, there begins the closure of exhaust port (25) at the same time that admission piston (2) begins to pass across admission port (23), thus generating a pressure air inlet and leading to the sweep of the above-mentioned remaining explosion gas. Afterwards, exhaust port (25) is closed while admission port (23) is still open, always as a consequence of its crankshaft (9) delay, which enables the engine to make an overload within cylinder (5) until in its upward stroke admission piston (2) closes the corresponding port(s) (23), as a consequence of which the full compression period begins between both pistons (2,2') until the above-mentioned process begins when the exhaust piston reaches its UDC.

The technical solution of eliminating valves in the engine uses a piston that serves as a controller by sealing of admission and exhaust ports, and making it possible to block or substantially block movement of fluids between the ports and cylinder. In essence, the rings form a chamber in which the ports are located. As depicted in FIG. 3 (with respect to a gasoline engine piston) and FIG. 4 (with respect to a diesel engine piston), the piston comprises at least two compression rings (14,15) one (14) of them being located on the piston head under the conventional oil ring (26), and the other one (15) on the skirt. These form a cylindrical chamber that encloses intake port(s) (23) and exhaust ports (25) when the respective pistons are at their lower dead centers.

Figure 5:
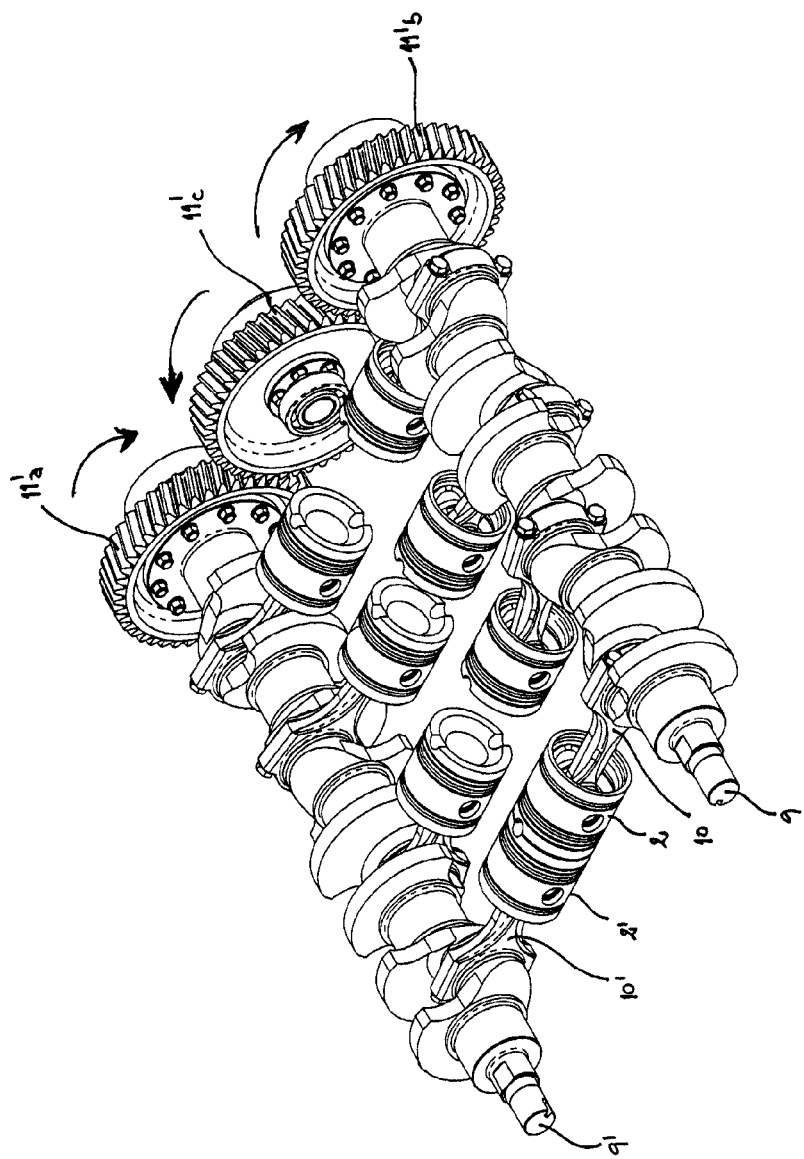
FIG. 5 shows a perspective view of two crankshafts linked by means of a train of three binding gears with their rotation direction senses shown with an arrows.
Figure 6:
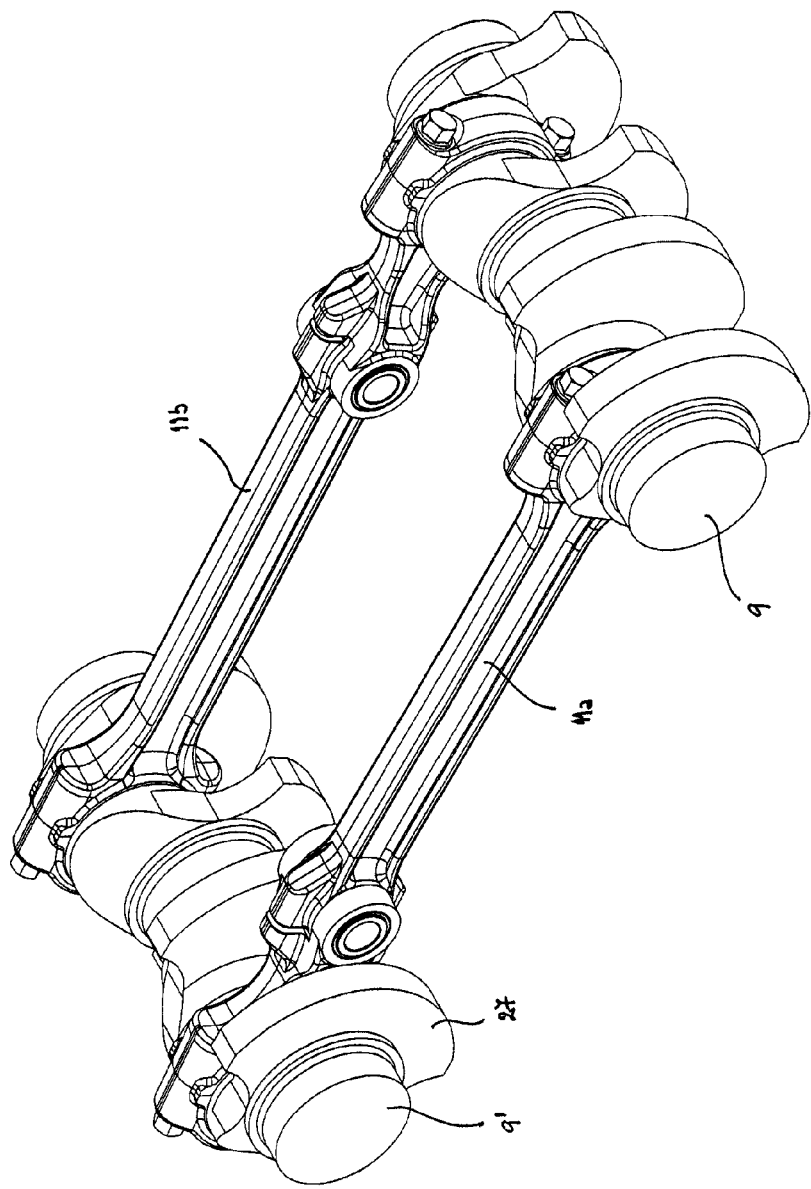
FIG. 6 shows a preferred embodiment of linking pins asymmetrically-articulated with a crankshaft section wherein they are coupled, showing the angular arrangement at 90° of the respective pins.
Figure 7:
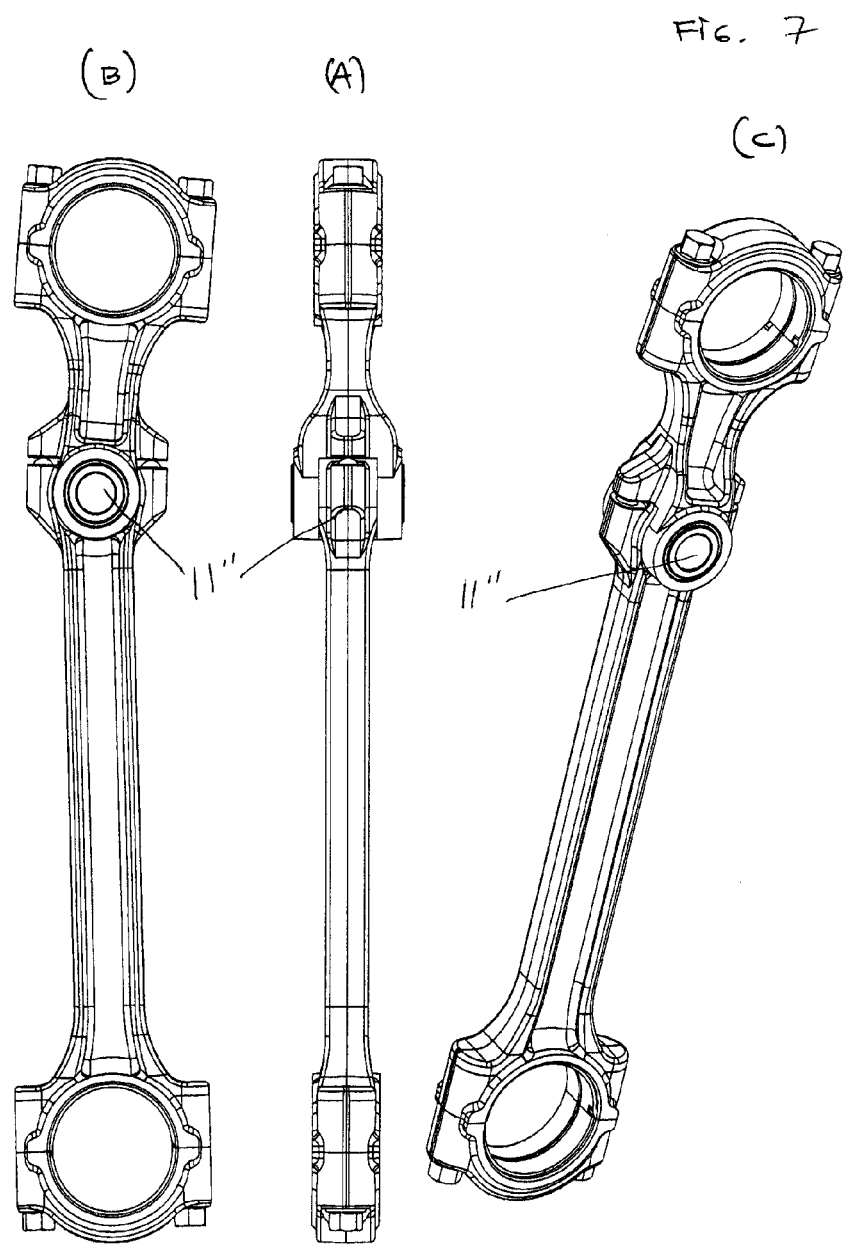
FIG. 7, Panel A, shows a top plan view of a preferred embodiment of the linking articulated pin of FIG. 6. Panel (B) shows a side plan view of the articulated linking pin. Panel (C) shows a perspective view.

With reference now to FIG. 5, it is to be highlighted that both pistons (2,2') travel an identical distance, due to the spacing of both crankshafts (9, 9') made through suitable coupling mechanical means (11'). In the embodiment shown in FIG. 5, three binding gears (11'a,11'b,11'c) can be used to link the two crankshafts. In another exemplary embodiment, depicted in FIG. 6, at least two stiff or elastic coupling pins (11a, 11b) can be used to connect and stabilize the two crankshafts (9,9'). Preferably, the coupling means comprises a gear binding train, and the gear binding train comprises a gear (11'a,11'b) at the end of each crankshaft and a gear (11'c) that binds the other two gears (11'a,11'b) among them. However, where two coupling pins (11a,11b) are used, the two are disposed out of phase by approximately 90° sexagesimal in order to maintain an invariable rotation direction and make an effective pacing and power transfer from one crankshaft (9) to the other (9').

As discussed above, the coupling means can comprise one or more coupling pins or rods (11a,11b). These coupling pins or rods can comprise a hinge or hinge-like structure (11") to allow the rod to bend, if needed. Flexing of the rod effectively allows the rod to change lengths. The ability to change lengths permits the crankshafts (9,9') to move apart or together (albeit only slightly) as the engine heats up and metal parts expand. Without such a hinge, the coupling points between the coupling pins and crankshafts would require play to allow for such expansion and contraction. Such play would result in excess wear on the parts, and an increase in the likelihood of failure.

The engine of the invention comprises intake and exhaust ports that are connected in a unitary fashion to intake and exhaust conduits, which in turn are connected in a unitary fashion to intake and exhaust ducts. In essence, the ducts are relatively large passageways that synthesize multiple smaller passageways referred to herein as intake and exhaust chambers. The chambers comprise at least one wall (typically circular) that terminates at a junction with a cylinder wall. The junction of the chamber wall and the cylinder wall thus defines a port. As mentioned above, the engine of the invention is preferably a monoblock type engine forged through die casting. The differences between ducts and chambers is thus function and relative position in the exhaust and intake systems, and thus also relates to relative size, not specifically distinct parts to be connected to other parts by physical means.

Figure 8:
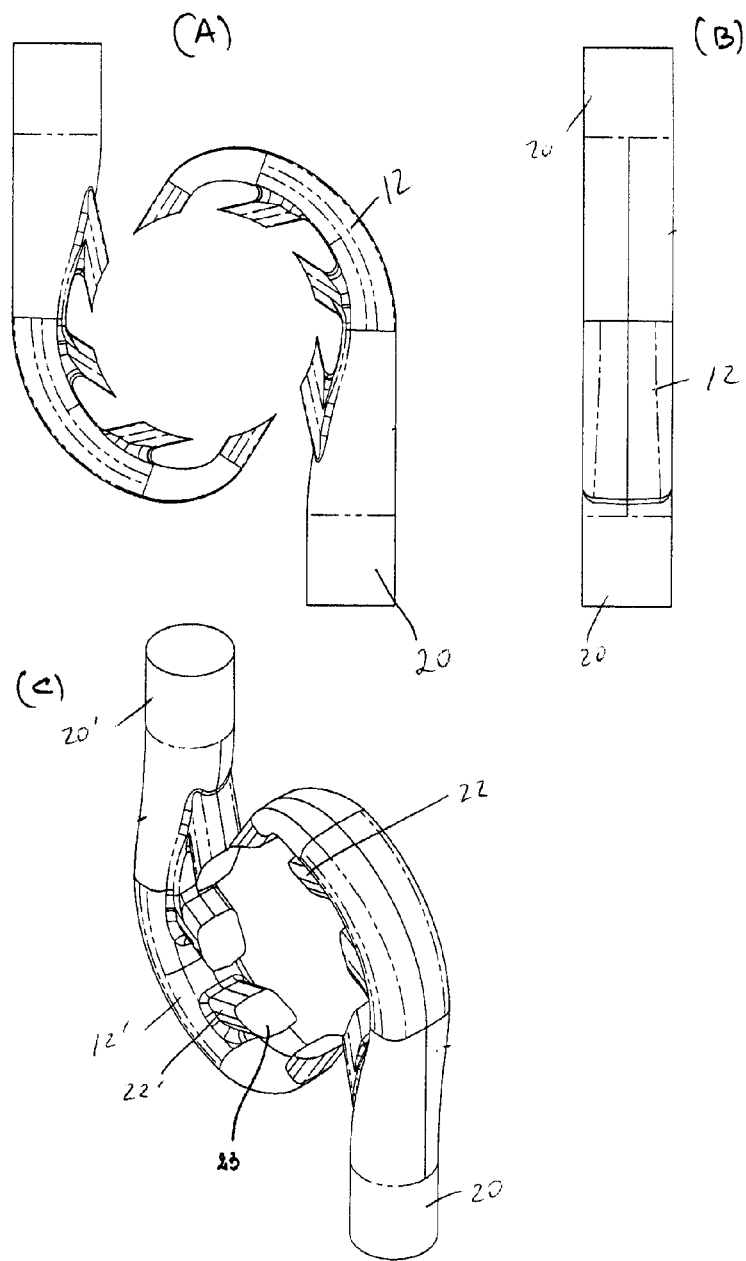
FIG. 8 shows an embodiment of an intake conduit. Panel (A) shows a view in side plan; Panel (B) shows a view in frontal plan; and Panel (C) shows a view in perspective.

FIG. 8 depicts an embodiment of an intake chamber and duct of the present engine. In this embodiment, intake ports (23) comprise the termini of intake chambers (12,12') and intake ducts (20,20'), which are configured in a substantially circular or substantially spiral shape. It is to be noted that the protrusions or connections (22,22') from the intake chambers (12,12') to the termini defining the intake ports (23) can be disposed at any angle relative to intake chambers (12,12'). That is, they may be disposed at any angle or at any multiples of angles normal to and/or parallel to the long axis of the intake chambers (12,12') to provide introduction of fluids into a cylinder at any suitable angle. For example, an angle may be chosen to maximize turbulence of an incoming fuel to maximize distribution and improve burning of the fuel. A substantially or precisely circular shape for the intake system is preferred to allow for use of multiple intake ports (23) and disposition of those ports at a single distance from the UDC of the intake piston (2).

In a like manner to the intake system depicted in FIG. 8, FIG. 9 depicts an exemplary exhaust system for the engine. In this embodiment, multiple exhaust ports (25) are defined by protrusions or connections (84) from exhaust chambers (13, 13') and exhaust ducts (18), which are configured in a substantially circular or substantially spiral shape. It is to be noted that the protrusions or connections (84) can be disposed at any angle relative to exhaust chambers (13,13'). That is, they may be disposed at any angle or at any multiples of angles normal to and/or parallel to the long axis of the exhaust chambers (13,13') to provide for various advantages, such as improved movement of exhaust gas from the cylinder, improved heat conduction away from the cylinder, and the like. A substantially or precisely circular shape for the exhaust system is preferred to allow for use of multiple exhaust ports (25) and disposition of those ports at a single distance from the UDC of the exhaust piston (2').

The engine (1) is capable of making the same number of explosions in each crankshaft (9,9') rotation as the number of cylinders (5) it has. Therefore, in embodiments, the engine of the present invention is an engine (1) of a monoblock type (4) having multi-cylindrical (5) horizontal pistons pairs (2,2') which are opposed in a monochamber or single cylinder (8). The engine can perform all of the typical strokes of a traditional thermodynamic cycle, that is: admission (intake), compression, explosion, and exhaust, and these strokes can be accomplished in each rotation of a crankshaft. To achieve a complete cycle per rotation, arrangement of the times for the strokes has been made in such a way to conform it to a new thermodynamic cycle of five phases, strokes, or well defined times, which are identified through a single movement of each of a number of pistons from each's lower dead center position (LDC) to each's upper dead center position (PMS), during which the following is performed: (i) compression/combustion assisted sweeping of the previous explosion's remaining gases and filling of the chamber, where both ports of admission and exhaust are open (see FIG. 10(A)); (ii) admission with overload, where only the admission port is open (see FIG. 10(B)); (iii) full compression with both ports closed (see FIG. 10(C)); and from each UDC to each PMI it carries out: (iv) explosion with expansion (see FIG. 10(D)); and (v) exhaust, where only the exhaust port is open (see FIG. 10(E)).

Figure 11:
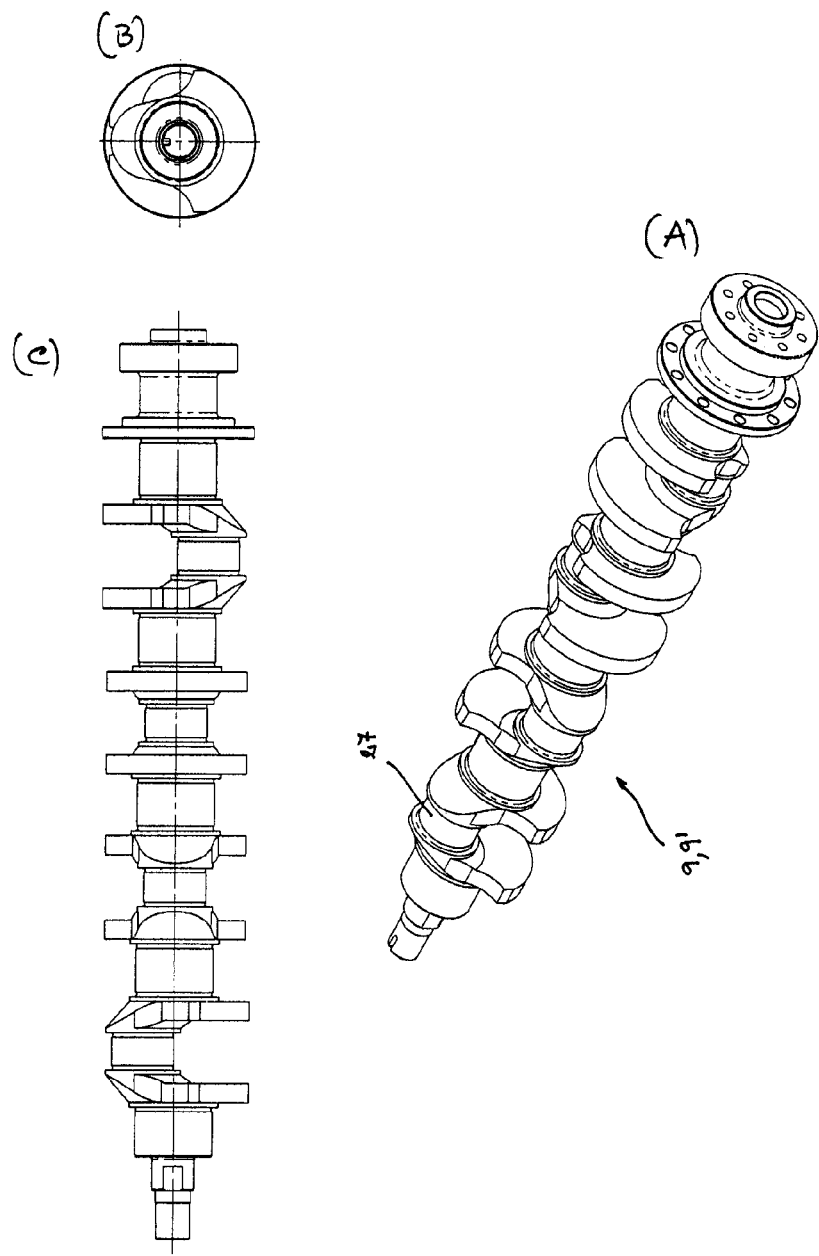
FIG. 11 shows a crankshaft for a four cylinder version of an embodiment of the engine according to the present invention, in which Panel (A) is a view in perspective of the crankshaft; Panel (B) is a view in frontal plan of the crankshaft; and Panel (C) is a view in upper plan of the crankshaft.

FIG. 11 depicts an embodiment of a crankshaft according to the present engine. It is preferred that the crankshafts are configured specifically with regard to the number of cylinders in the engine. That is, it is preferred that the crankshaft connections to the pistons be arranged such that cylinder firing order corresponds to crankshaft connection angle. Stated another way, cylinders and crankshaft connections preferably are designed according to a principle of equitable distribution of periods between explosions according to the formula:

360°/(number of cylinders)=degrees equivalent to intervals between explosions.

Such a design is possible because the engine makes an explosion per cylinder per crankshaft rotation, and as such, the intervals between explosions can be based on 360°.

Figure 12:
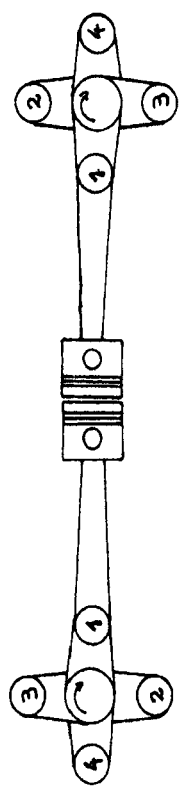
FIG. 12 shows a plot of the angular position of a crankshaft for a version of an engine with 4 cylinders.
Figure 13:
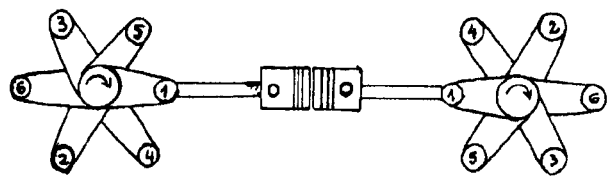
FIG. 13 shows a plot of the angular position of a crankshaft for a version of an engine with 6 cylinders.
Figure 14:
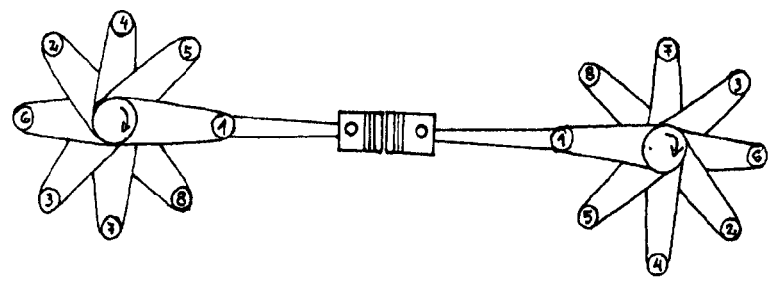
FIG. 14 shows a plot of the angular position of a crankshaft for a version of an engine with 8 cylinders.

As depicted in FIG. 9, in a four-cylinder engine, this principle is achieved preferably with a crankshaft pin (27) arrangement at 90°, thus enabling an explosion every 90°. Specifically, in a four cylinder engine, we know that each revolution of 360° divided by the number of cylinders (4 in this particular case) gives 90° as a result, which defines the intervals of degrees between explosion. This concept is further depicted in FIG. 12. Applying this same principle to an embodiment of an engine having 6 cylinders, we can say: 360°/6=60°. There will be, then, an explosion in cylinder number one and, for example, with the sequence of traditional ignition 1-5-3-6-2-4, the admission piston of cylinder number five will reach its UDC at 60° and as such an explosion will take place in that cylinder at that time, and so on at intervals of 60°. This scenario is depicted in the diagram in FIG. 13. Further, in an embodiment of an engine having 8 cylinders, we have 360°/8=45°. There will be, then, an explosion in cylinder number one, and with a sequence of ignition 1-5-4-2-6-3-7-8, the admission piston of cylinder number five will reach its UDC at 45° and as such an explosion will take place in that cylinder at that time, and so on successively at intervals of 45°. If, on the other hand, the sequence is 1-3-7-2-6-5-4-8, after an explosion in cylinder number one, the admission piston in cylinder number three will reach its UDC at 45° and an explosion will take place in that cylinder at that time, and so on at intervals of 45°. This scenario is depicted in FIG. 14.

Figure 15:
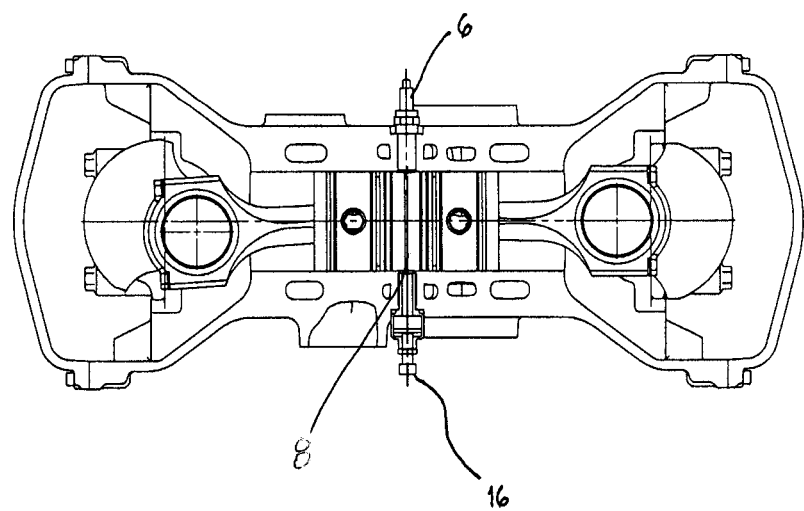
FIG. 15 shows a cross-section of a cylinder of an embodiment of the present engine, having an auxiliary compression chamber substituting for one of the spark plugs.

Looking now in particular at FIG. 15 and FIG. 16, a mechanism for varying the compression ratio of one or more cylinders of an engine is provided. More specifically, FIG. 15 depicts a cross-section of an engine according to an embodiment of the invention. As depicted in the figure, one spark plug (e.g., 6' of FIG. 1(A)) is replaced by an auxiliary chamber (16). As depicted in FIG. 16, auxiliary chamber (16) may have screw threads or other typical means for inserting it into an opening in an engine. The auxiliary chamber (16) may also, as depicted specifically in FIG. 16(C), comprise an open passageway (160) leading from the proximal end (which connects with the engine) of chamber (16) to a blind chamber (161) within chamber (16). The volume defined by blind chamber (161) can be varied by movement up and down of platform (162). Platform (162) may be moved and set at any position within blind chamber (161) by actuation with rod (163). Rod (163) may cause platform (162) to move back and forth within blind chamber (161) through known means, such as by way of screw threads on the surface of rod (163) and mating threads on the inner surface of auxiliary chamber (16). Movement and setting of platform (162) can be accomplished by electronic or manual means, in accordance with known principles.

In practice, auxiliary chamber (16) functions as a chamber that increases the volume of combustion chamber (8). The volume within blind chamber (161) can be adjusted to finely tune the total volume of combustion chamber (8), thus altering the compression ratio of the cylinder without having to change the diameter of the cylinder, the length of piston connecting rods, or any other element of the engine.

As mentioned above, the present engine is designed to allow for burning of multiple different types of fuels, and to allow for changing of fuel types used in a single particular engine. In main part, this variation is permitted through varying of the compression ratio by varying the size (or volume) of the combustion chamber using an auxiliary chamber. The compression ratio may be varied in a fixed or automatic form with an auxiliary chamber (16) located in the center of the principal combustion/compression chamber (8), so the engine is able to work with different fuels in relations comprised between approximately 6:1 for fuels of low octane, alcohols, gasohol, etc, and approximately 11:1 for combustibles of normal or high octane, being able to do it with gas oil and or vegetable oils with compression ratio of approximately 17:1 up to approximately 25:1 with direct injection. Of course, where a fuel type is to be changed, it might also be advantageous or necessary to change the pistons (e.g., replace pistons designed for gasoline engines with pistons designed for diesel engines). Likewise, it might also be advantageous or necessary to change other elements of the engine to complete a fuel transfer, such as replacing spark plugs with glow plugs, replacing fuel delivery mechanisms (e.g., replacing indirect fuel injectors of a gasoline engine with direct fuel injectors of a diesel engine).

In the case of an engine embodiment with diesel oil as a fuel, the pistons (2, 2') preferably will have an engravement (30) on their heads (see FIG. 4, for example) in order to optimize the spraying effect of the diesel oil injector (21) (see FIG. 1(B), for example). The engine in a diesel version works with the direct injection principle because there is no prechamber. In fact, the fuel injection is made directly over the piston heads. According to a preferred engine embodiment in which diesel oil is used as the fuel, in the maximum compression stage, the diesel oil injection in combination with the air oxygen causes an explosion due to the compression between both pistons.

The first injections with the cold engine are thermally assisted by an electric heater or glow plug, which is commanded by a timer. The injection and the rotation speed of the engine are commanded by the recurrence rate of the injector that receives diesel oil at the diesel oil pump pressure for a direct injection or a conventional "common rail" system, in which case it may receive small pre-injections while the compression stroke is carried out.

Once the explosion has taken place, the pistons (2,2') move in the same manner as described above for a gasoline engine, thus achieving a system in which every time the pistons reach their maximum compression points, fuel is ignited and an explosion is made, and the objective of obtaining an efficient engine that produces work during 50% of the piston stroke is fulfilled.

Figure 17:
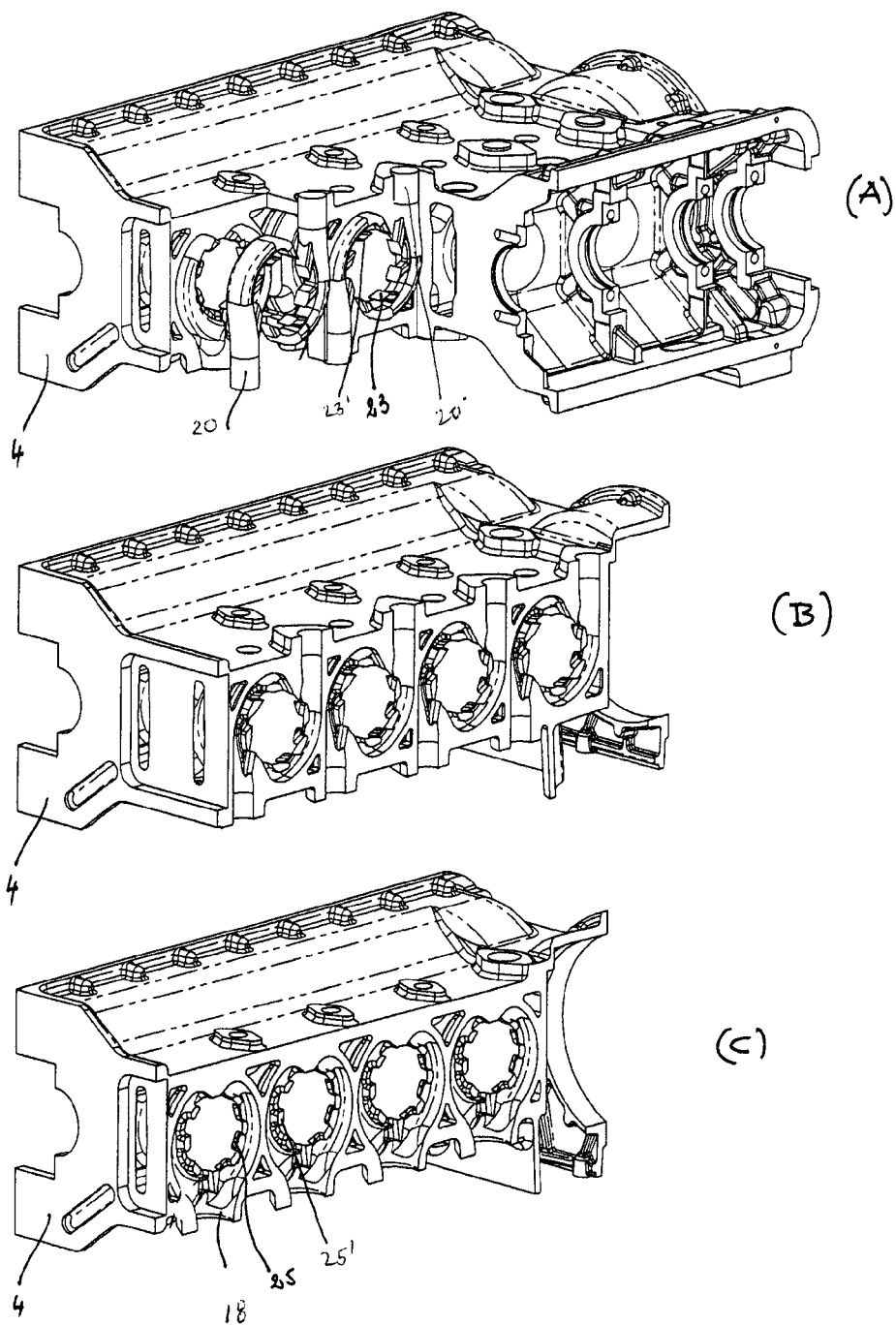
FIG. 17, Panels (A)-(C) show scaled cuts of a block according to an embodiment of the present engine, showing spiral-shaped intake and exhaust conduits.
Figure 18:
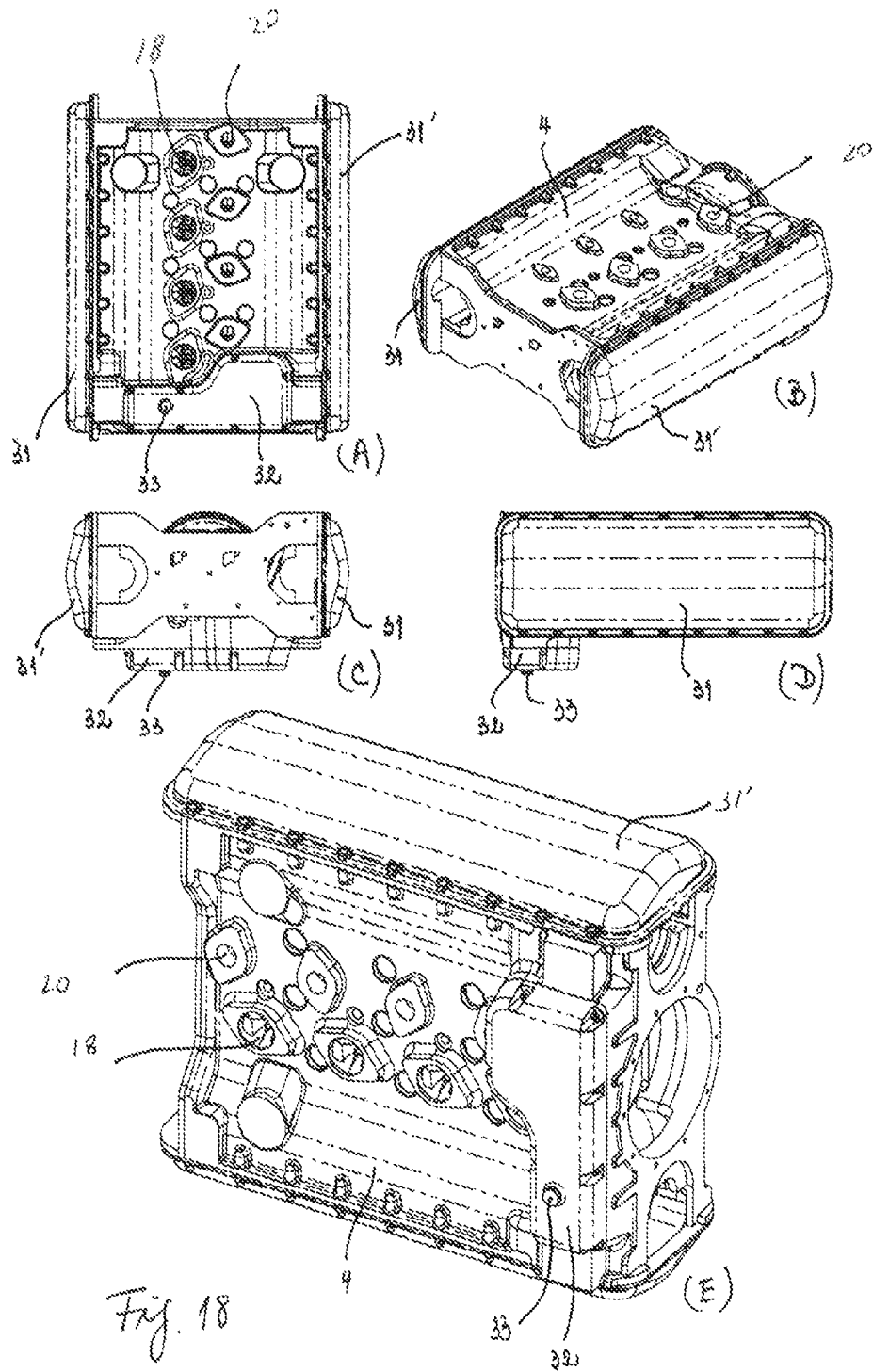
FIG. 18, Panels (A)-(E), show various views of a monoblock engine with its crankcase cover (dry oil pan) and oil pan, according to an embodiment of the invention.

Turning now to FIGS. 17 and 18, various views of an exemplary engine of the invention are shown. These figures depict exemplary positioning of various elements to provide a compact, horizontal, monoblock engine (4). Looking at FIG. 17, one can see the placement of intake ports (23,23') and exhaust ports (25,25') and their respective intake ducts (20,20') and exhaust ducts (18). It is to be noted that intake ports (23,23') are united in a common fluid connection by a "U"-shaped tube (not depicted), which is sealed on one end and connected at the other end to a supercharger in a manner by which overpressurized air (or air/fuel mixture) is delivered to each intake port (23,23') at substantially or exactly the same pressure and volume. Likewise, it is to be understood that exhaust ports (25,25') are united in a common fluid connection by a duct or manifold, which is suitable for physically connecting to the vehicle's exhaust system.

FIG. 18 depicts the exterior of an exemplary monoblock engine (4), showing relative placement of intake ducts (20), exhaust ducts (18), side dry oil pans (31,31'), and lower pan (oil pan) (32) as the unique oil deposit, which has at least one drainage plug (33).

It should be noted here that under the described working conditions, there being fewer idle strokes of the pistons, wear out is less than in current commercially available engines, and consequently a longer duration of the engine is obtained. Furthermore, the fact that the work/stress of the mobile parts, which usually suffer a bigger wear out, is distributed between two pistons, two rods, and two crankshafts per cylinder. Thus, there is a considerable increase in the useful life of the engine, with the consequence that the optimum working conditions of a new engine is retained for a longer time.

Further, in view of the fact that the engine of the present invention has no cylinder lid, the problems caused thereby are eliminated, such as the deformation of its supporting surface against the block, which causes joint heating and the consequent reheating of the whole engine and its efficiency loss or destruction of its working ability. Likewise, a timing belt is not needed, again reducing moving parts and the need for repairs.

Screws or studs for compressing and holding a lid against the engine block are also not necessary, due to the monoblock construction. The traditional camshaft, which causes a power loss, and the synchronizing belts with change periods due to their wear out are not necessary either, as the engine does not use traditional intake and exhaust valves and their associated mechanical parts.

Also note that there being no cylinder lid with an oil bath for the lubrication of the camshaft, lifters, and/or tappets, the problem of those engines that after some time of use consume oil due to an inefficient seal which is the consequence of the aging of the valve seals is eliminated. In addition, the engine of the present invention may be easily maintained and repaired. For example, the parts subject to heavy wear, such as rings and metal rods, may be replaced just by removing both side oil pans (31, 31') and one of the crankshafts (9, 9').

In its various embodiments, the present engine provides numerous advantages over currently available commercial engines. For example, in a "typical" commercial engine available for motor vehicles, when an explosion occurs at each upper dead center for a piston, a vibration is produced. For each explosion, the crankshaft turns twice, providing additional vibration. In contrast, in the present engine, a single explosion in a cylinder drives two pistons in each of two crankshaft rotations. There is thus a reduction in the number of explosions required to create mechanical energy, and thus the present engine vibrates much less than a "traditional" one. Furthermore, in the present engine, each crankshaft turns approximately twice as slow per unit mechanical energy produced, as compared to a "traditional" engine, thus further reducing vibration, such as that caused by imperfections in the balancing of crankshafts. In addition, in a conventional four-cylinder engine using a four stroke cycle, an explosion is caused every 180° of crankshaft rotation, while in the engine of the present invention, an explosion is made every 90° of crankshaft rotation. This reduction in the degree of crankshaft rotation reduces stress produced per cylinder, and allows the engine to run smoother, and at the same time, with more torque. Viewed another way, the present engine has the same torque at a fewer number of crankshaft rotations, which results in a longer duration of the engine, longer useful life of moving parts, such as the pistons, crankshafts, and bed frame bearings, and longer life of certain non-moving parts, such as bolts, rings, and metal rods.

The present engine is applicable to any requirement in which an internal combustion engine is needed. It thus can be used in motor vehicles (e.g., cars, trucks, buses), water vehicles (e.g., boats, ships, submarines), and air vehicles (e.g., airplanes, helicopters). It likewise is adaptable, and thus may be designed to burn any number of fuels, including but not necessarily limited to gasoline, gasoline with additives (e.g., ethanol), ethanol, methanol, methane (natural gas), propane, biofuels (e.g., biodiesel), and diesel oil.

The present engine provides a better working efficiency than that of a traditional internal combustion engine. In fact, at an equal piston size, shape, and length, the present engine provides more power because it provides a longer time of effective work per crankshaft rotation. In turn, by the reduction of the amount of parts, including both those subject to a friction wear out and the static ones, an effective decrease in the consumption of fuel is achieved because the working strokes represent 50% or so of the movement of the piston and not 25% or so as in a traditional four stroke engine. The present engine also shows a better weight/power ratio and is easier to repair and maintain, which results in a lower operative cost. For example, during the working of the present engine, the loss in conversion of thermal energy to mechanical energy is decreased, as compared to a traditional engine. Specifically, a tradition engine normally loses energy in the cylinder lid and the lid joint, the loss being caused by the friction in the camshaft, the lifters, and the tappet. Further energy is lost in non-productive motion of the pistons, as the pistons use energy during the intake stroke, a compression stroke, and the exhaust stroke. In summary, a conventional engine achieves about 25% of effective work, whereas the present engine achieves about 50% of effective work.

Figure 19:
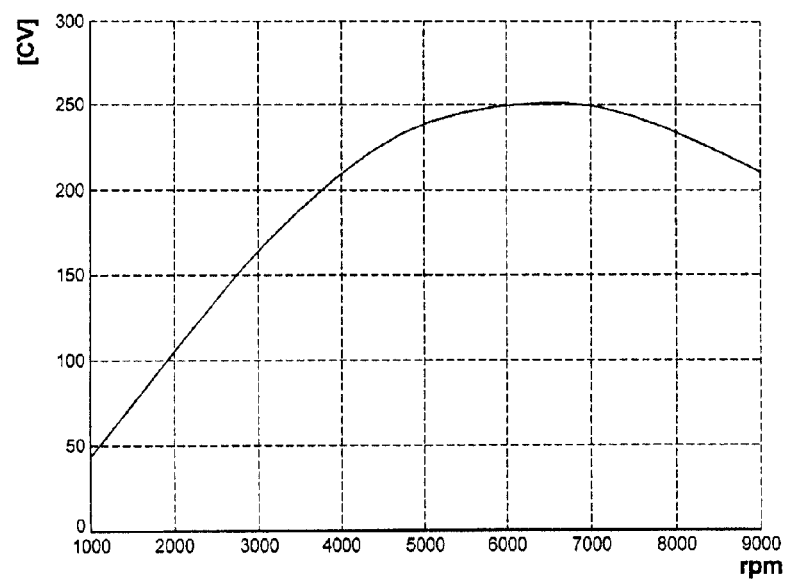
FIG. 19 shows a line graph plotting power (CV) as a function of engine speed (rpm) for an exemplary four-cylinder engine having a displacement of 1,950 cm$^3$ (cc).

For example, as shown in FIG. 19, an embodiment of the present engine can show a broad power curve, achieving a rapid increase in power at typical engine speeds during commuter driving (e.g., 2,000-3,500 rpm), and a sustained maximum power from about 4,000 rpm to about 9,000 rpm. The graph shown in the figure refers to a four cylinder engine having a displacement of 1950 cm³. The graph shows that, for this engine, which has a maximum power output at, and red-line of above, about 6,000 rpm, there is a substantial power output at low engine speed and a sustained increase in power from low engine speed toward 6,000 rpm. The typical working range of 3000-6000 rpm produces 165-250 CV, resulting in a final conversion of 125 CV per liter of cubic capacity. Of course, as with any engine, after passing the maximum power output point (in this case, 6,000-7,000 rpm), the power decreases.

Figure 20:
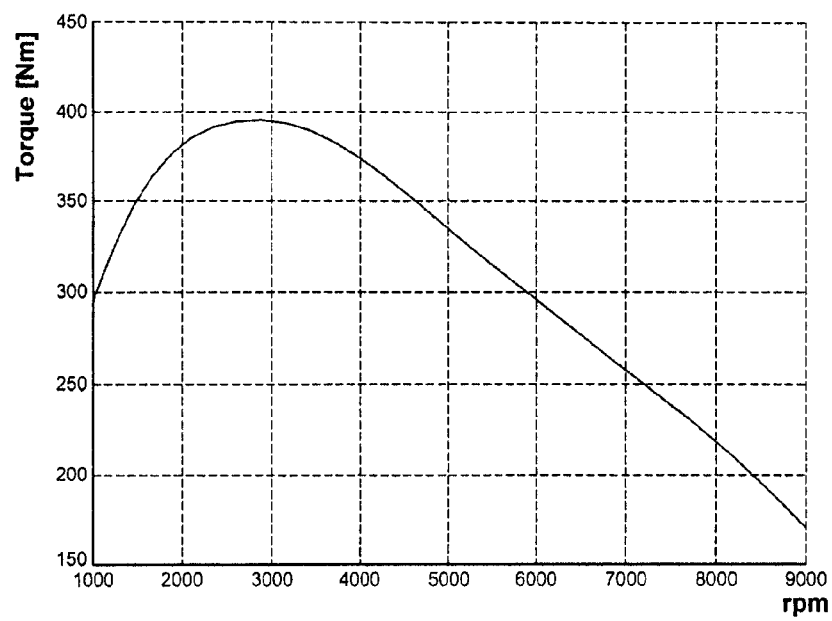
FIG. 20 shows a line graph plotting torque (Nm) as a function of engine speed (rpm) for an exemplary four-cylinder engine having a displacement of 1,950 cm$^3$ (cc).

The unique design of the present engine also provides superior torque properties. As seen in FIG. 20, an engine of the present invention can achieve high torque at very low engine speeds, and provide maximal torque at typical engine speeds for commuter driving. Like the power curve shown in FIG. 19, the torque curve shows a broad maximal torque production, which substantially represents typical driving conditions for an average driver. According to the torque curve, an elastic engine behavior is seen: below about 2,500 rpm, there is a rapid increase in torque with an increase in engine speed, whereas between 3,000 and 6,000 rpm, the curve descends. In practice, this means that torque is delivered quickly and effectively at normal driving speeds, whereas torque diminishes at higher engine speeds, where a high level torque is typically not required. Furthermore, the elasticity of the curve shows that, when torque is needed, the engine supplies it without the need for re-gearing (i.e., down shifting of the transmission to increase engine speed). Thus, for example, when a vehicle encounters an incline, as engine speed naturally drops due to the increased demand (assuming no additional fuel is delivered to the engine), torque increases, thus providing more power to the wheels and decreasing the need to downshift to maintain speed.

In view of the disclosure above, the present invention provides, in embodiments, an internal combustion engine comprising: (1) at least one cylinder comprising a proximal end and a distal end, each cylinder containing a first piston and a second piston arranged in opposite directions within the cylinder and on opposite sides of the center of the cylinder, and each cylinder comprising a wall defining an interior volume, wherein each cylinder comprises at least one intake port on the proximal half of the cylinder and at least one exhaust port on the distal half of the cylinder, each port disposed as openings in the cylinder wall, wherein a surface of the piston heads of the first and second pistons create in combination with the cylinder wall a combustion chamber for ignition and burning of fuel; (2) at least two crankshafts, a first crankshaft connected to the first piston at the proximal end of the cylinder, and a second crankshaft connected to the second piston at the distal end of the cylinder; (3) at least one device for causing ignition of fuel in the combustion chamber, the device being disposed on and through the cylinder wall at or near the upper dead center of travel within the cylinder for the first piston; wherein each of the crankshafts completes a single revolution about its own axis per fuel ignition event. In the engine, movement of the first piston back and forth along the cylinder causes opening and closing of the intake port(s), and movement of the second piston back and forth along the cylinder causes opening and closing of the exhaust port(s). To allow for proper opening and closing of the ports, the first piston and the second piston are disposed within the cylinder such that the first piston is delayed in its movement back and forth through the cylinder as compared to the second piston. The delay can be defined by an angle of deflection from a line parallel to the long axis of the cylinder, wherein the delay is from 15° to 25°, such as, for example, 18°. In operation, for each fuel ignition event, each of the pistons makes a single complete cycle back and forth through the cylinder, wherein a single complete cycle of the two pistons results in a single complete cycle of fuel ignition, expansion, exhaust, and intake of new fuel. Each fuel ignition event sequentially causes: opening of the exhaust port(s) by the second piston; opening of the intake port(s) by the first piston; closing of the exhaust port(s) by the second piston; and closing of the intake port(s) by the first piston. Opening of the exhaust port(s) by the second piston allows exhaust gas to exit the combustion chamber; opening of the intake port(s) by the first piston allows intake of air or other fluids into the combustion chamber; closing of the exhaust port(s) by the second piston allows for overcharging of the combustion chamber by continued intake of fluid from the intake port(s); and closing of the intake port(s) by the first piston seals the combustion chamber and allows for compression of fluid within the combustion chamber. Closing of the exhaust port(s) while the intake port(s) remain open allows for overcharging of the combustion chamber with air or an air/fuel mixture. The engine can be described as a five-stroke engine that completes the following five strokes per single cycling of the first and second pistons back and forth through the cylinder and a single revolution of the first and second crankshafts about their respective centers: ignition and burning of fuel in the combustion chamber with all exhaust and intake ports closed; exhaust of exhaust gas from the combustion chamber through the at least one exhaust port, which is opened by the movement of the second piston down the cylinder and away from the point of ignition; sweeping, with a positive pressure of air, of exhaust gas from the combustion chamber through the at least one exhaust port using air introduced through the at least one intake port, which is opened by the movement of the first piston down the cylinder and away from the point of ignition; creating an overpressure of air and fuel in the combustion chamber by forcing, with a positive pressure, air and fuel into the combustion chamber through the open intake port(s) after the exhaust port(s) are closed by movement of the second piston along the cylinder toward the point of ignition; and compressing the air and fuel mixture in the combustion chamber after closing of the intake port(s) by movement of the first piston along the cylinder toward the point of ignition. The engine can include a supercharger for providing the positive pressure of air and/or the overpressure of air and fuel. In the engine, the two crankshafts can be physically connected to each other by way of a train of gears or at least one connecting bar, such as, for example two connecting bars, each of which are elastic and allow for expansion and contraction as the engine changes temperature. According to the engine, each of the pistons comprises two sets of rings, each of the sets of rings comprising at least one compression ring, wherein the two sets of rings are disposed on the pistons such that, when a piston is at its upper dead center, the two sets of rings in conjunction with the cylinder wall define a chamber that encompasses the intake or exhaust port(s), thus sealing and separating the port(s) from the combustion chamber. In certain embodiments, the engine includes at least one auxiliary combustion chamber in fluid connection with the combustion chamber, the volume of which can be adjusted. Likewise, the engine can include at least one intake chamber and duct combination for each cylinder, each combination in fluid connection with at least one intake port, and each combination configured to cause turbulence to fluids introduced into the cylinder through the intake port(s). Further, the engine can include at least one exhaust chamber and duct combination for each cylinder, each combination in fluid connection with at least one exhaust port, and each combination configured to cause turbulence to fluids into the cylinder or taken from the cylinder through the exhaust port(s). The engine causes the same number of fuel ignition events per crankshaft revolution as the engine has cylinders. Of course, the engine may be used for any purpose that an internal combustion engine can be used, such as in a vehicle, such as an automobile, a boat, or an airplane.

It will be apparent to those skilled in the art that various modifications and variations can be made in the practice of the present invention [and in construction of this device] without departing from the scope or spirit of the invention. Other embodiments of the invention will be apparent to those skilled in the art from consideration of the specification and practice of the invention. It is intended that the specification and examples be considered as exemplary only, with a true scope and spirit of the invention being indicated by the following claims.

The invention claimed is:

1. An internal combustion engine comprising:
    at least one cylinder comprising a proximal end and a distal end, each cylinder containing a first piston and a second piston arranged in opposite directions within the cylinder and on opposite sides of the center of the cylinder, and each cylinder comprising a wall defining an interior volume,
    wherein the first piston and the second piston are disposed within the cylinder such that the first piston is delayed in its movement back and forth through the cylinder as compared to the second piston,
    wherein each cylinder comprises at least one intake port on the proximal half of the cylinder and at least one exhaust port on the distal half of the cylinder, each port disposed as openings in the cylinder wall,
    wherein each of the pistons comprises two sets of rings, each of the sets of rings comprising at least one compression ring, wherein the two sets of rings are disposed on the pistons such that, when a piston is at its upper dead center, the two sets of rings in conjunction with the cylinder wall define a chamber that encompasses the intake or exhaust port(s), thus sealing and separating the port(s) from the combustion chamber and crankcase,
    wherein a surface of the piston heads of the first and second pistons create in combination with the cylinder wall a combustion chamber for ignition and burning of fuel;
    at least two crankshafts, a first crankshaft connected to the first piston at the proximal end of the cylinder, and a second crankshaft connected to the second piston at the distal end of the cylinder, wherein the delay of the first piston as compared to the second piston results from an offset of the angle of one crankshaft as compared to the other, the angle being defined by an angle of deflection from a line parallel to the long axis of the cylinder and being pre-set to a desired, unvarying, number of degrees;
    at least one device for causing ignition of fuel in the combustion chamber, the device being disposed on and through the cylinder wall at or near the upper dead center of travel within the cylinder for the first piston; and
    wherein each of the crankshafts completes a single revolution about its own axis per fuel ignition event.

2. The engine of claim 1, wherein movement of the first piston back and forth along the cylinder causes opening and closing of the intake port(s), and movement of the second piston back and forth along the cylinder causes opening and closing of the exhaust port(s).

3. The engine of claim 1, wherein the pre-set delay between the first piston and the second piston is from 15° to 25°.

4. The engine of claim 3, wherein the pre-set delay is 18°.

5. The engine of claim 1, wherein, for each fuel ignition event, each of the pistons makes a single complete cycle back and forth through the cylinder, wherein a single complete cycle of the two pistons results in a single complete cycle of fuel ignition, expansion, exhaust, and intake of new fuel.

6. The engine of claim 1, wherein each fuel ignition event sequentially causes:
    opening of the exhaust port(s) by the second piston;
    opening of the intake port(s) by the first piston;
    closing of the exhaust port(s) by the second piston; and
    closing of the intake port(s) by the first piston.

7. The engine of claim 6, wherein:
    opening of the exhaust port(s) by the second piston allows exhaust gas to exit the combustion chamber;
    opening of the intake port(s) by the first piston allows intake of air or other fluids into the combustion chamber;
    closing of the exhaust port(s) by the second piston allows for overcharging of the combustion chamber by continued intake of fluid from the intake port(s); and
    closing of the intake port(s) by the first piston seals the combustion chamber and allows for compression of fluid within the combustion chamber.

8. The engine of claim 7, wherein closing of the exhaust port(s) while the intake port(s) remain open allows for overcharging of the combustion chamber with air or an air/fuel mixture.

9. The engine of claim 1, which is a five-stroke engine that completes the following five strokes per single cycling of the first and second pistons back and forth through the cylinder and a single revolution of the first and second crankshafts about their respective centers:
    ignition and burning of fuel in the combustion chamber with all exhaust and intake ports closed;
    exhaust of exhaust gas from the combustion chamber through the at least one exhaust port, which is opened by the movement of the second piston down the cylinder and away from the point of ignition;
    sweeping, with a positive pressure of air, of exhaust gas from the combustion chamber through the at least one exhaust port using air introduced through the at least one intake port, which is opened by the movement of the first piston down the cylinder and away from the point of ignition;
    creating an overpressure of air or air and fuel in the combustion chamber by forcing, with a positive pressure, the air or air and fuel into the combustion chamber through the open intake port(s) after the exhaust port(s) are closed by movement of the second piston along the cylinder toward the point of ignition; and
    compressing the air or air and fuel mixture in the combustion chamber after closing of the intake port(s) by movement of the first piston along the cylinder toward the point of ignition.

10. The engine of claim 9, which comprises a supercharger for providing the positive pressure of air and/or the overpressure of air and fuel.

11. The engine of claim 1, which has a horizontal configuration and a monoblock construction.

12. The engine of claim 1, which does not comprise intake or exhaust valves, a cylinder lid and joint, or a camshaft.

13. The engine of claim 1, wherein the two crankshafts are physically connected to each other by way of a suitable coupling mechanical means.

14. The engine of claim 13, wherein the two crankshafts are physically connected to each other by way of a train of gears or at least one connecting bar.

15. The engine of claim 14, comprising two connecting bars, each of which are elastic and allow for expansion and contraction as the engine changes temperature.

16. The engine of claim 1, further comprising:
- at least one auxiliary combustion chamber in fluid connection with the combustion chamber, the volume of which can be adjusted.

17. The engine of claim 1, comprising:
- at least one intake chamber and duct combination for each cylinder, each combination in fluid connection with at least one intake port, and each combination configured to cause turbulence to fluids introduced into the cylinder through the intake port(s).

18. The engine of claim 1, comprising:
- at least one exhaust chamber and duct combination for each cylinder, each combination in fluid connection with at least one exhaust port, and each combination configured to cause turbulence to fluids into the cylinder or taken from the cylinder through the exhaust port(s).

19. The engine of claim 1, wherein the engine causes the same number of fuel ignition events per crankshaft revolution as the engine has cylinders.

20. A motor vehicle comprising the engine of claim 1, wherein the vehicle is an automobile, a boat, or an airplane.

* * * * *